United States Patent
Kaplan et al.

(10) Patent No.: US 11,842,395 B2
(45) Date of Patent: Dec. 12, 2023

(54) SECURE AND TRUSTWORTHY COMPUTING ENVIRONMENTS FOR EXCHANGES

(71) Applicant: Ava Labs, Inc., New York, NY (US)

(72) Inventors: Michael Edmond Kaplan, Brooklyn, NY (US); Emre Kanatli, New York, NY (US); Bernard Wong, Waterloo (CA); Emin Gün Sirer, New York, NY (US)

(73) Assignee: Ava Labs, Inc., Brooklyn, NY (US)

( * ) Notice: Subject to any disclaimer, the term of this patent is extended or adjusted under 35 U.S.C. 154(b) by 0 days.

(21) Appl. No.: 17/559,694

(22) Filed: Dec. 22, 2021

(65) Prior Publication Data

US 2022/0198563 A1   Jun. 23, 2022

Related U.S. Application Data

(60) Provisional application No. 63/130,025, filed on Dec. 23, 2020.

(51) Int. Cl.
*H04L 29/06* (2006.01)
*G06Q 40/04* (2012.01)
(Continued)

(52) U.S. Cl.
CPC ............. *G06Q 40/04* (2013.01); *G06F 21/51* (2013.01); *G06F 21/57* (2013.01);
(Continued)

(58) Field of Classification Search
CPC .............. G06Q 40/04; G06Q 30/0609; G06Q 2220/00; G06F 21/51; G06F 21/57; H04L 9/085; H04L 9/3236; H04L 9/3247
See application file for complete search history.

(56) References Cited

U.S. PATENT DOCUMENTS

| | | | |
|---|---|---|---|
| 6,895,506 B1 * | 5/2005 | Abu-Husein | G06F 21/6209 713/1 |
| 7,376,614 B1 | 5/2008 | Scheinberg et al. | |

(Continued)

OTHER PUBLICATIONS

PCT International Search Report and Written Opinion in International Appln. No. PCT/US2021/64940, dated Mar. 17, 2022, 16 pages.

(Continued)

*Primary Examiner* — Taghi T Arani
*Assistant Examiner* — Lin Chang
(74) *Attorney, Agent, or Firm* — Barnes & Thornburg LLP

(57) ABSTRACT

A system for providing an exchange in a trusted execution environment can include an exchange program that is configured to provide a digital exchange for digital assets and a computer system with a secure enclave that is configured to provide the trusted execution environment within which processing of programs is secure from observation and manipulation by other operations outside of the secure enclave. Execution of the exchange program in the secure enclave can include loading the exchange program into secure memory within the secure enclave, performing an attestation operation on the exchange program loaded into the secure memory within the secure enclave, the attestation operation configured to validate the exchange program, and outputting results of the attestation operation to identify whether the exchange program loaded in the secure enclave is valid.

29 Claims, 13 Drawing Sheets

(51) Int. Cl.
*G06Q 30/0601* (2023.01)
*G06F 21/51* (2013.01)
*G06F 21/57* (2013.01)
*H04L 9/08* (2006.01)
*H04L 9/32* (2006.01)

(52) U.S. Cl.
CPC ......... *G06Q 30/0609* (2013.01); *H04L 9/085* (2013.01); *H04L 9/3236* (2013.01); *H04L 9/3247* (2013.01); *G06Q 2220/00* (2013.01)

(56) References Cited

U.S. PATENT DOCUMENTS

| | | |
|---|---|---|
| 9,673,975 B1 | 6/2017 | Machani |
| 9,875,368 B1* | 1/2018 | Willden ................ H04L 9/0825 |
| 11,184,335 B1* | 11/2021 | Beloussov .......... H04L 63/0861 |
| 2007/0156567 A1* | 7/2007 | Odintsov ............... G06Q 30/08 705/37 |
| 2009/0234768 A1 | 9/2009 | Slyke |
| 2014/0019764 A1 | 2/2014 | Gopal et al. |
| 2014/0325235 A1 | 10/2014 | Thompson et al. |
| 2014/0325644 A1* | 10/2014 | Oberg ..................... G06F 21/57 726/22 |
| 2016/0182531 A1* | 6/2016 | Rubakha ................ G06F 21/57 726/1 |
| 2017/0011460 A1 | 1/2017 | Molinari et al. |
| 2017/0352027 A1 | 12/2017 | Zhang et al. |
| 2018/0330079 A1 | 11/2018 | Gray |
| 2019/0013932 A1 | 1/2019 | Maino et al. |
| 2019/0095879 A1* | 3/2019 | Eyal ..................... G06Q 20/223 |
| 2019/0114706 A1* | 4/2019 | Bell ...................... H04L 9/3239 |
| 2020/0226296 A1* | 7/2020 | Pan ........................ H04L 63/062 |
| 2021/0097528 A1* | 4/2021 | Wang ........................ H04L 9/30 |
| 2021/0166313 A1* | 6/2021 | Cho ..................... G06Q 20/389 |

OTHER PUBLICATIONS

Developer.Samsung.com [online], "Samsung Blockchain Keystore", published on or before Dec. 21, 2021, retrieved on Feb. 25, 2022, retrieved from URL<https://developer.samsung.com/blockchain/keystore/overview.html>, 2 pages.

Github.com [online], "Mobile Coin Foundation", published on or before Dec. 21, 2021, retrieved on Feb. 25, 2022, retrieved from URL<https://github.com/mobilecoinfoundation/mobilecoin#overview>, 8 pages.

IBM.com [online], "Turning on the Lights in Africa", published on or before Dec. 21, 2021, retrieved on Feb. 25, 2022, retrieved from URL<https://www.ibm.com/case-studies/irene-energy-hybrid-cloud-blockchain/>, 13 pages.

\* cited by examiner

SECURE AND TRUSTWORTHY COMPUTING ENVIRONMENTS FOR EXCHANGES

CROSS-REFERENCE TO RELATED PATENT APPLICATIONS

This application claims the benefit of priority to U.S. Provisional Application No. 63/130,025, filed Dec. 23, 2020, the entire contents of which are hereby incorporated by reference.

FIELD

The present document generally relates to secure and trustworthy computing environments for exchanges, such as exchanges provided and run within a secure computing enclave.

BACKGROUND

A variety of computer systems have been developed to provide electronic exchanges that permit for and process transactions among market participants. For example, centralized and decentralized exchanges have been developed that permit for digital assets to be traded between market participants. Centralized exchanges can include, for example, a centralized ledger that is maintained by a centralized host to track and resolve asset ownership among market participants. Decentralized exchanges can include, for example, multiple ledgers that are maintained across multiple different hosts that, together, reconcile and resolve asset ownership among the market participants through consensus processes. Decentralized exchanges have been implemented using blockchain technology.

Various secure computing environments have been developed, which can protect various aspects of processes within the secure computing environments from observation, detection, or manipulation by third party actors (e.g., malware). For example, secure computing enclaves have been developed that include hardware components of computing devices that provide operations to execute code in an encrypted environment that can shield the operations and/or data being processed from third party actors. For instance, a computing device can include one or more specialized processors that are configured to allow user-level and/or operating system code to define private and encrypted regions of memory, sometimes called enclaves.

SUMMARY

The disclosed technology is generally directed to secure and trustworthy computing environments to provide exchanges, such as exchanges permitting trades of cryptocurrencies and/or other digital assets. Conventional exchanges permit users to buy and sell digital assets over decentralized or centralized networks, such as via exchanges that are implemented using blockchains. Such conventional exchanges can have tradeoffs, however, such as a tradeoff between retaining control over their assets and getting the best price, missing out on access to innovative products and risking trading with bad entities, and putting up with high-friction onboarding or usability challenges and paying high fees to transact. For example, centralized exchanges (CEXs) may permit for trades to be processed and reconciled more quickly, but may limit market participation and may be susceptible to manipulation or other nefarious interference by the CEXs host. Conversely, decentralized exchanges (DEXs) may provide for expanded market participation and may avoid some of the issues associated with the trustworthiness of a centralized host, but may be slower to process and reconcile trades.

Regarding the downsides of CEXs, they can have limited asset listings that are dependent on the CEX host (e.g., slow or no listing of many digital assets), significant risk of loss of funds due to hacks and other security incidents, and 'black box' matching and settlement algorithms that many in the industry suspect may offer unfair advantages and preferential treatment to select users. Regarding the downsides of DEXs, they typically rely on matching and settling trades on-chain, which can be slow, error prone, and can expose users to front running and/or slippage. Furthermore, many DEXs run on the Ethereum blockchain, and therefore may only support ETH and ERC-20 assets, and due to network congestion, users must pay significant network transaction fees. Additionally, smart contracts that take temporary custody and settle the trades on DEXs may have bugs which result in the loss of user funds. Moreover, most DEXs operate outside of regulatory frameworks, potentially exposing their users to inadvertent trading with illicit and sanctioned counterparties.

The disclosed technology can do away with these tradeoffs—permitting for fast, secure, and trustworthy exchanges to be provided—by providing exchanges within secure computing environments that leverage and use secure computing enclaves to process transactions of digital assets. The disclosed technology's use of enclaves to provide exchanges can permit a variety of advantages, including for cross-chain and fair transactions in which users can trade any asset while maintaining control of their assets. Such enclave-based exchanges can, for instance, provide the best features of both CEXs and DEXs without the downsides of each one, with enclave-based exchanges providing fast trading speeds, confidentiality of user information, and a secure environment to trade. Additional features, such as cross-chain support, can allow for trading heterogeneous assets across multiple different chains, such as Bitcoin, ERC-20, Eth, and any other assets that are based on different chains. Moreover, fast order matching, settlement, and advanced order types allows for a secure, safe, and trustworthy environment for digital asset transacting.

The disclosed technology can provide computing environments that are trustworthy to market participants regardless of the computing environment and the party controlling the computing environment in which it is being processed. For example, code to implement a secure exchange, in part, within an enclave may be replicated and installed in a variety of different computing environments, which may be hosted by different parties. The exchange can be run and processed within the secure enclaves, which can shield the transactions that are processed and the contents of the exchange from the host, providing assurance to the market participants that the exchange is fair to all market participants and free from manipulation. Furthermore, the code to implement the exchanges can be securely verified, such as through verifying a checksum for some or all portions of the code that are used to provide the exchange, which can provide assurances that the underlying code and processes for the exchange has not been modified or otherwise manipulated. Such verification can be requested by and provided to market participants (e.g., on demand, regular basis), which can permit for market participants to better monitor and verify that exchanges are trustworthy.

In one implementations, a system for providing an exchange in a trusted execution environment can include an exchange program that is configured to provide a digital exchange for digital assets and a computer system with a secure enclave that is configured to provide the trusted execution environment within which processing of programs is secure from observation and manipulation by other operations outside of the secure enclave. Execution of the exchange program in the secure enclave can include loading the exchange program into secure memory within the secure enclave, performing an attestation operation on the exchange program loaded into the secure memory within the secure enclave, the attestation operation configured to validate the exchange program, and outputting results of the attestation operation to identify whether the exchange program loaded in the secure enclave is valid.

Implementations can include any, all, or none of the following features. For example, the execution of the exchange program in the secure enclave further includes receiving a request from outside the secure enclave to validate the exchange program and wherein the attestation operation and outputting the results are performed in response to the request to validate the exchange program, wherein outputting the results comprises transmitting the results outside the secure enclave. The request can be received from a computing device associated with a participant in the digital exchange, and the results can be transmitted to the computing device in response to the request.

The attestation operation and outputting the results can be performed in response to a request made by any client to perform the attestation operation at any time, the exchange program can be run and can provide the digital exchange in response to the results of the attestation operation validating the exchange program loaded in the secure enclave.

The computer system can further provide the digital exchange by running the exchange program within the secure enclave. Providing the digital exchange can include matching, by the exchange program running within the secure enclave, orders for the digital assets, and adding, by the exchange program running within the secure enclave, records for the matched orders to an order book for the digital exchange. The records for the matched orders can transfer ownership of the digital assets from one exchange participant to another exchange participant. Loading the exchange program the secure enclave further can include loading at least a portion of the order book into the secure memory, the order book and the exchange program can be loaded from a trustless storage system outside of the secure enclave, the order book and the exchange program being stored in the trustless storage system with encryption provided by the secure enclave. The secure enclave can be configured to automatically decrypt all data loaded into the secure memory and to automatically encrypt all data transferred out of the secure memory for persistent storage. Providing the digital exchange can further include generating, by the exchange program running within the secure enclave, validation values for the records added to the order book, the validation values being used to validate that the records have not been modified outside of the secure enclave, transmitting, by the exchange program running within the secure enclave, the records and the validation values to the trustless storage system for persistent storage, wherein the secure enclave automatically can encrypt the records and the validation values when transmitted out of the secure enclave, and can cause the records and the validations values to be stored in the trustless storage system with encryption specific to the secure enclave. Providing the digital exchange further can include loading, after the transmitting and by the exchange program running within the secure enclave, the records and the validation values from the trustless storage system, wherein the secure enclave automatically decrypts the records and the validation values when loaded from the trustless environment into the secure memory, and validating, by the exchange program running within the secure enclave, the records using the validation values. The validation values can include entries in a Merkle tree that correspond to the records in the order book, generating the validation values can include generating the entries in the Merkle tree to reflect the records added to the order book, and validating the records can include accessing the entries from the Merkle tree corresponding to the records to validate that the records have not been modified outside of the secure enclave. The secure memory can include volatile memory within the secure enclave and the trustless storage system comprises non-volatile memory. The matching can be performed in the trusted execution environment without having to wait for consensus across multiple different computing nodes.

Execution of the exchange program in the secure enclave further can include providing the digital exchange by running the exchange program within the secure enclave. Providing the digital exchange can include matching, by the exchange program running within the secure enclave, orders for the digital assets, and adding, by the exchange program running within the secure enclave, records for the matched orders to an order book for the digital exchange. The records for the matched orders can transfer ownership of the digital assets from one exchange participant to another exchange participant. Loading the exchange program the secure enclave further can include loading at least a portion of the order book into the secure memory, the order book and the exchange program can be loaded from a trustless storage system outside of the secure enclave, the order book and the exchange program can be stored in the trustless storage system with encryption provided by the secure enclave, and the secure enclave can be configured to automatically decrypt all data loaded into the secure memory and to automatically encrypt all data transferred out of the secure memory for persistent storage. Providing the digital exchange further can include generating, by the exchange program running within the secure enclave, validation values for the records added to the order book, the validation values being used to validate that the records have not been modified outside of the secure enclave, transmitting, by the exchange program running within the secure enclave, the records and the validation values to the trustless storage system for persistent storage, wherein the secure enclave can automatically encrypt the records and the validation values when transmitted out of the secure enclave, and can cause the records and the validations values to be stored in the trustless storage system with encryption specific to the secure enclave. Providing the digital exchange further can include loading, after the transmitting and by the exchange program running within the secure enclave, the records and the validation values from the trustless storage system, wherein the secure enclave can automatically decrypt the records and the validation values when loaded from the trustless environment into the secure memory, and validating, by the exchange program running within the secure enclave, the records using the validation values. The validation values can include entries in a Merkle tree that correspond to the records in the order book, generating the validation values can include generating the entries in the Merkle tree to reflect the records added to the order book, and validating the records can include accessing the entries from the Merkle tree corresponding to the records to validate that the records have not been modified outside of the secure enclave. The secure memory can include volatile memory within the secure enclave and the trustless storage system can include non-volatile memory. The matching can be performed in the trusted execution environment without having to wait for consensus across multiple different computing nodes. Identifiers for the exchange participants can be encrypted when they are outside of the secure enclave to provide confidentiality, and can only accessible in an unencrypted form from the secure memory within the secure enclave.

The attestation operation can include retrieving a validated hash value for the exchange program that is loaded in the secure enclave with the exchange program, wherein the validated hash value was previously generated from a validated version of the exchange program, generating a current hash value of the exchange program as loaded into the secure memory, and comparing the validated hash value and the current hash value to determine whether the exchange program loaded into secure memory is valid. A client computing device can also be included in the system and configured to (i) initiate the remote attestation operation by transmitting a request to the computer system, (ii) retrieve the validated hash value for the exchange program, (iii) receive the current hash value from the computer system, and (iii) perform the comparing of the validated hash value and the current hash value to remotely validate the exchange program. The current hash value can be retrieved from another computer system that makes the validated hash value for the exchange program publicly accessible. The exchange program can be loaded from a trustless storage system outside of the secure enclave, the exchange program can be stored in the trustless storage system with encryption provided by the secure enclave, the secure enclave can be configured to automatically decrypt all data loaded into the secure memory and to automatically encrypt all data transferred out of the secure memory for persistent storage, and the computer system can be configured to generate the current hash of the exchange program as unencrypted within the secure enclave.

The execution of the exchange program in the secure enclave further can include providing the digital exchange by running the exchange program within the secure enclave. Providing the digital exchange can include receiving, by the exchange program running within the secure enclave, a request to establish a leveraged order on the digital exchange, allocating, by the exchange program running within the secure enclave, an available proportion of a pool of digital assets traded on the digital exchange for the leveraged order, establishing, by the exchange program running within the secure enclave, the leveraged order against the proportion of the pool of digital assets, and adding, by the exchange program running within the secure enclave, a record for the leveraged order to an order book for the digital exchange. The record for the leveraged order can identify the leveraged order as a loan of the proportion of the pool of digital assets to a user establishing the leveraged order. The pool of digital assets can include a plurality of digital assets traded on the digital exchange that collective provide a liquidity pool against which leveraged order are established. Terms of the loan can require the proportion of the pool of digital assets to be returned to the liquidity pool and for payment of interest on the proportion of the pool of digital assets in an amount proportional to a duration and size of the loan. The exchange program can further be configured to automatically liquidate the leveraged order if a value of the digital assets falls below a predefined value that is greater than a value of the loan and accrued interest at a time of liquidation. The automatic liquidation and determinations of the values can be performed by the exchange program running within the secure enclave. The terms of the loan further can require that profits and losses for the proportion of the pool of digital assets from the leveraged order be added to and subtracted from, respectively, a balance for the leveraged order. Loading the exchange program the secure enclave further can include loading at least a portion of the order book into the secure memory, the order book and the exchange program can be loaded from a trustless storage system outside of the secure enclave, the order book and the exchange program can be stored in the trustless storage system with encryption provided by the secure enclave, and the secure enclave can be configured to automatically decrypt all data loaded into the secure memory and to automatically encrypt all data transferred out of the secure memory for persistent storage.

Records for the digital assets can be maintained in an order book for the digital exchange. The system can further include a federated exchange computer system that can provide a federated digital exchange of federated digital assets. The federated digital exchange can permit for digital assets across a plurality of digital exchanges to be traded, the plurality of digital exchanges each using the exchange program executed within a secure enclave to provide their corresponding digital exchange. At least one of the federated digital assets can include an exclusive right to run the digital exchange and to manage the order book for the digital assets for a period of time, wherein the federated digital exchange can include a federated record for the exclusive right to run the digital exchange, the federated record identifying the computer system. A smart contract can be used to assign an exclusive right to manage an order book. Providing the federated digital exchange by the federated exchange computer system can include matching orders for the federated digital assets and adding federated records for the matched orders to a federated order book for the federated digital exchange. The federated records for the matched orders can transfer ownership of the federated digital assets from one federated exchange participant to another exchange participant. Matching the orders for the federated digital assets can include selecting, from a pool of candidate bids for a federated digital asset that is being offered on the federated digital exchange, one or more bids that satisfy one or more additional criteria associated with the federated digital asset and identifying a matching bid and offer from among the one or more bids. For at least one federated digital asset including the exchange right to run the digital exchange, the one or more additional criteria can include a minimum bond amount provided by a bidder for the duration of the period of time. The minimum bond amount can be provided as collateral for running the digital exchange and is configured to be seized in the event that the bidder fails to satisfy one or more criteria associated with the exchange right. At least one of the matched orders can include a matched order for the exclusive right to run the digital exchange for the period of time.

Execution of the exchange program in the secure enclave can also include generating an encryption key for the digital exchange that is derived from an enclave key, wherein the encryption key is specific to the digital exchange and the secure enclave, encrypting exchange data for the digital exchange using the encryption key, splitting the encryption key into a plurality of partial keys, wherein each of the plurality of partial keys can be configured to be incapable of decrypting the exchange data by itself, wherein at least a minimum threshold of the plurality of partial keys can be required to recover the encryption key, and transmitting the plurality of partial keys to a plurality of remote computer systems that are under administrative control by one or more third parties. The encryption key may not be regenerated if the exchange program is modified or if the exchange program is run in a different enclave. The exchange data can include an order book with records for matched orders for the digital exchange that are stored in a Merkle tree. The system can further include the plurality of remote computer systems that receive and securely store a partial key provided by digital exchange running in the secure enclave, limit access to the stored partial key to instances when the digital exchange is validated by the attestation operation as being unmodified and running within the secure enclave. The attestation operation can be initiated by the remote computer system in response to an out-of-channel request for the stored partial key from the computer system, the proportion of the pool of digital assets of one of a plurality of tranches of assets from the pool of digital assets, and each of the tranches provides different levels of risks and rewards with higher risk tranches providing the potential for greater risks and also greater rewards. The digital exchange can settle losses starting with a highest risk tranche from the plurality of tranches and then subsequently against lower risk tranches in sequential order of risk until the losses are fully settled. The digital exchange can allocate profits starting with the highest risk tranche from the plurality of tranches and then subsequently against the lower risk tranches in sequential order of risk until the profits are fully allocated, and the settling of losses and allocations of profits can be performed by the digital exchange running within the secure enclave.

The attestation operation can include communicating with one or more remote oracle systems to obtain a current state of a blockchain associated with the digital exchange. The one or more remote oracle systems can verify, based on the current state of the blockchain associated with the digital exchange, that (i) a deposit of digital assets was made by an exchange participant and (ii) the digital exchange received the deposit of digital assets.

The orders for digital assets can include deposits of the digital assets and withdrawals of the digital assets by exchange participants. The records can include order book entries, exchange participant credentials, and account balances of exchange participants. The deposits can transfer ownership of the digital assets to keys kept in control of the secure enclave.

One or more advantages can be recognized from various implementations of the disclosed technology, systems, and methods. For example, the disclosed technology can provide for users to trade tokens or other digital assets across any blockchain. Traditionally, users may not be able to trade different digital assets across different chains. As a result, users have limited ability to invest in different opportunities and ventures. The disclosed technology can permit users to apply their digital assets to any transaction across any chain.

In another example, the disclosed technology can match and settle transactions faster than, for instance, DEXs. Enclave-based exchanges can use a server that also maintains an unsecured non-enclave environment. As a result, transacting in the enclave exchange can be more akin to transacting off the blockchain, on a centralized server or network. Transacting off the blockchain can be faster than transacting on the blockchain because settling transactions off the blockchain does not require authentication or validation from a plurality of anonymous nodes that run the blockchain. The disclosed technology can therefore provide for faster matching and settlement of transactions, which can be beneficial to, for example, retail and institutional traders as well as market makers.

In a further example, the disclosed technology can permit users to experience a more simplified and streamlined process to trade assets. For example, a federation of exchanges that each exchanges an asset-pair can be pooled together. This can allow a user with a single interface (e.g., webpage) from which to access many different exchanges.

In another example, the disclosed technology can permit for new tokens to be accessed faster. When a new token is developed, the proponents of the token can quickly and easily generate exchanges to allow adopters to trade into and out of that token with other, established tokens. This can increase ease of use and can also encourage more rapid adoption by quickly creating supporting tools for a new token.

In a further example, the disclosed technology can provide for fair and trustworthy matching. Using signature matching functions, such as a Merkle tree, inside enclave-based exchanges can provide for encryption of client data. An operator of the enclave-based exchange cannot see or modify the encrypted client data. Therefore, the operator may not have the ability to adjust transactions or establish unfair matching that satisfies private interests or the interests of one client over another.

In another example, data confidentiality can be maintained since client data is encrypted within the enclave exchange. An encryption key can be maintained inside the enclave while the client data is stored in memory outside the enclave. Encrypting the data can ensure that hackers or other outside entities (third parties) cannot listen in on the exchange or access the encrypted data while it is being stored. As a result, this can prevent hackers from deciding to attack and exploit the exchange. Operators of the exchange may also not know details of transactions occurring in the exchange, which can prevent the operators from trying to manipulate the transactions and/or promote certain transactions over others. Moreover, when data is requested and brought back into the enclave environment, signature matching can be used to validate the data and ensure that it has not been altered in any way while in storage. The signature matching can be advantageous to ensure security of client data as well as continuous confidentiality of client data.

In a further example, the disclosed technology can provide the advantages of a centralized exchange (e.g., confidentiality, quick order matching) while also providing the advantages of decentralized exchanges (e.g., fair matching, trustworthiness).

In another example, the disclosed technology can provide for more secure custody of funds, thereby permitting users to maintain control of their assets. Client data can be encrypted with private keys. Since the operator of the enclave environment may not have access to such private keys, the operator may not be able to manipulate the client data.

Other features, aspects and potential advantages will be apparent from the accompanying description and figures.

DETAILED DESCRIPTION

Figure 1:
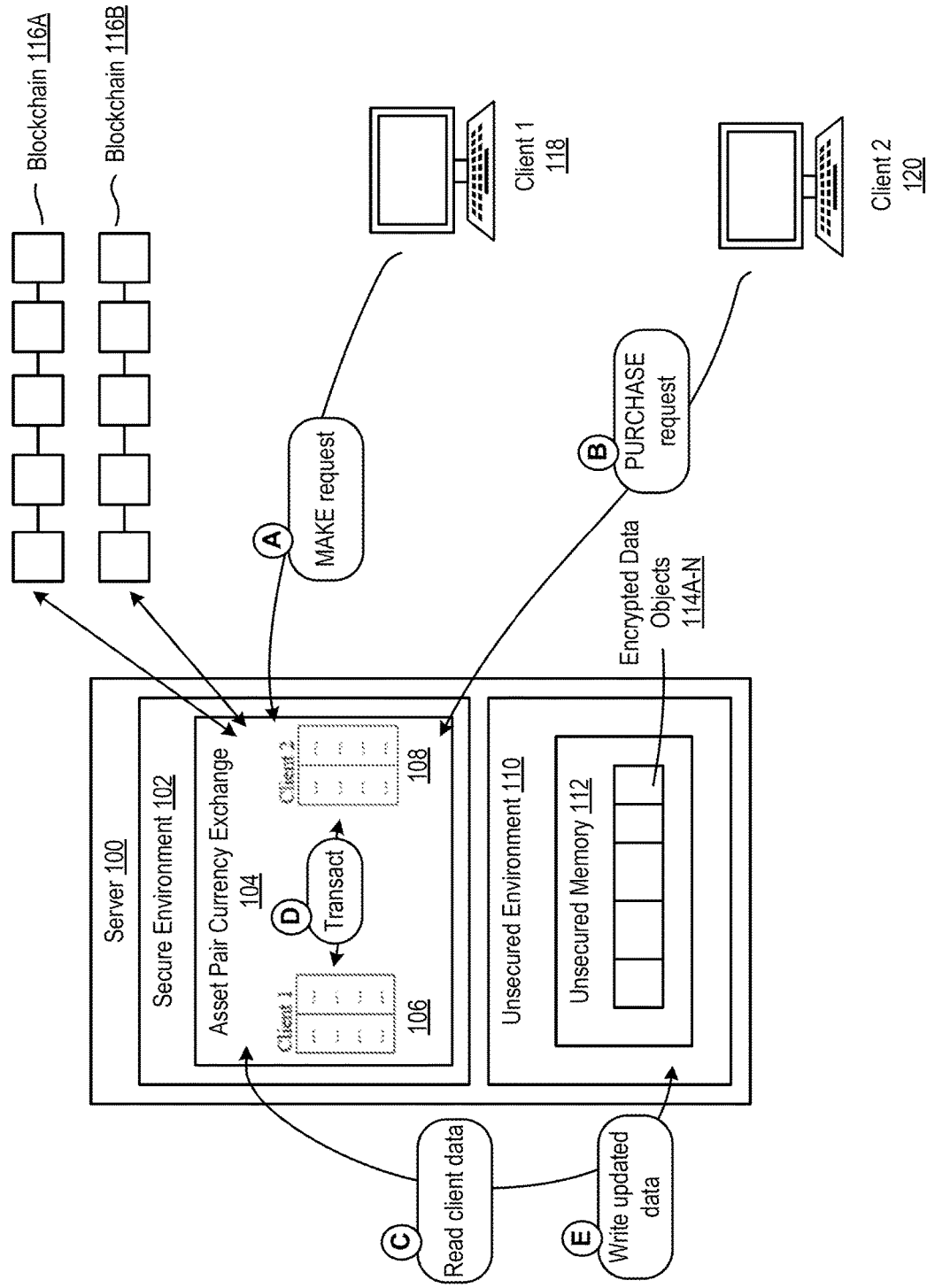
FIG. 1 is a conceptual diagram of an enclave exchange described herein.

The disclosed technology is generally directed to providing secure and trustworthy exchanges in, for example, enclave-based environments for transacting digital assets. Such enclave-based environments can provide for reconciling and matching transactions faster than traditional blockchain technologies. Using the enclave environment, users (e.g., clients) can transact with different digital assets across different chains, including but not limited to Bitcoin, Ethereum, ERC20 tokens, and assets from other chains such as AVAX. The users can be buyers and sellers of cryptocurrencies.

The disclosed technology can also provide for managing liquidity pools containing user-supplied assets. A liquidity pool can support leveraged orders by supplying a predefined fraction of assets required to place a leveraged order as a loan to a user placing the order (e.g., making a request to exchange assets). The user can return borrowed assets to the liquidity pool and pay interest on the borrowed assets, where that interest can be proportional to a duration and size of the loan. The disclosed technology can also programmatically liquidate assets acquired from the leveraged order if a value of the assets drop below a predefined value that is larger than the value of the loan and its accrued interest at a time of liquidation. This disclosed technology can run or operate within a secure enclave environment, which can ensure that interest calculations and liquidation actions follow the disclosed technology's specifications without alteration from any operator.

Users, such as buyers and sellers, can invest into liquidity pools and receive a fraction of the liquidity pools' earnings or losses. The disclosed technology can maintain a balance for each investment made by a user. An investment's entitled earnings can be added to the investment's balance. Moreover, an investment's share of any losses can be subtracted from the investment's balance. Since the disclosed technology can run within a secure enclave environment, this can provide for earnings and losses to be calculated based on the disclosed technology's specifications without being altered by any operator.

Moreover liquidity pools can be divided into one or more tranches. A user can choose whether to invest in a specific tranche. Tranches can offer different degrees of risk and reward. In some implementations, losses can be first settled from funds in a high risk tranche before they can be settled from funds in a lower risk tranche. In other implementations, a higher risk tranche can offer its investors a larger share of earnings compared to a lower risk tranche. Therefore, the tranches can offer users with more investment choices. Since the disclosed technology can run within a secure enclave environment, this provides for calculating earnings and losses for each tranche based on the disclosed technology's specifications, which cannot be altered by any operator.

The exchanges can be run in a secure enclave environment on a server that also runs an unsecured non-enclave environment. Using a server to host both secure and unsecured environments can provide for faster transacting as well as storage of data in a private way, where both actions are separate from activity and entity influence in typical blockchain implementations. In some examples, one or more physical servers can be used and hosted on public clouds.

Transactions can be processed within a secure enclave, however transaction data can be encrypted and stored in memory in the unsecured non-enclave environment. The enclave may have no or limited running memory, so data can be encrypted inside the enclave then securely sent (as encrypted data) outside into the unsecured non-enclave environment to be securely stored and maintained in non-enclave memory. One or more encryption keys for such data can be maintained inside the enclave and may not be modified later, even by an operator of the enclave exchange. When data is requested from the non-enclave memory by the enclave, the encrypted data can be brought back into the enclave where a signature matching function, such as a Merkle tree, can be implemented to ensure the data has not been manipulated or altered while in storage outside of the enclave. Such a process can be used to ensure that anonymity, confidentiality, and security are maintained. Such a process can also ensure that entities outside the enclave environment (e.g., exchange operator) cannot listen in on the exchange, or change data or conditions of the exchange. Furthermore, such a process can ensure that an entity or operator running the exchange maintains a fair playing field in the exchange that does not favor one market participant over others. Using the signature matching function, the enclave can validate the encrypted data, then decrypt the data, and use it to complete requests of remote client(s) in performing transactions in the enclave.

In some implementations, an encryption key for the data can be broken up into partial keys and distributed to entities outside the enclave environment for storage. These partial keys can then be recovered without disclosing the keys to any one entity. For example, on a first execution of an exchange, an encryption key can be derived from an enclave's key. This key cannot be re-derived if the exchange is modified or if the exchange is migrated to run on a different enclave processor. The encryption key for that exchange can be used to encrypt data stored in a Merkle tree associated with that exchange. To support recovery of the encryption key, the key can be split into multiple partial keys using a secret sharing algorithm. Each partial key can be sent or transmitted to different remote servers (e.g., nodes of a blockchain, state-servers, oracles, etc.) that are under administrative control by an independent third party. Each partial key alone cannot decrypt data that is encrypted with the encryption key. However, by combining some predefined threshold of partial keys, the original encryption key can be recovered and then used to decrypt encrypted data. Therefore, an exchange can recover its encryption key by retrieving a predefined threshold of partial keys from the remote servers. In some examples, a remote server may provide the exchange with its partial key(s) under the following conditions: (1) the remote server can verify, via a remote attestation protocol, that the requesting exchange is running within a secure enclave environment and that the enclave is running an approved version of the exchange software and (2) that the remote server received a request confirmation from an operator of the exchange over an out-of-band channel (e.g., telephone or email). Once one or more of these conditions are satisfied, the remote server has validated or verified the exchange and the partial key can be sent to the exchange and used in recovering the original encryption key. This process can be advantageous to ensure that data is kept secure and unaltered when stored outside of the secure enclave exchange. This process can also be advantageous to ensure that a malicious entity or an entity other than an exchange operator does not gain access to encrypted data that is associated with the exchange.

FIG. 1 is a conceptual diagram of an enclave exchange. A server 100 houses both a secure environment 102 and an unsecure environment 110. The server 100 can be in communication (e.g., wired and/or wireless) with a client 1 118 and a client 2 120. The server 100 can communicate with a plurality of client computing devices, all of which are associated with users seeking to transact via the enclave exchange described herein. In some examples, the server 100 can be one or more physical servers hosted on public clouds.

Housing both environments 102 and 110 on the server 100 is advantageous because it provides for faster and more secure transacting. When the environments 102 and 110 are located on the blockchain, anonymous nodes interact with each other to complete a transaction, which can take more time to verify the transaction but also increases a risk that the anonymous nodes manipulate the exchange, thereby resulting in an unequal and unfair trading environment. To prevent this problem, the secure environment 102 (e.g., enclave exchange) and the unsecured environment 110 (e.g., non-enclave environment) are housed by the server 100.

The secure environment 102 can be used to host one or more enclave exchanges. The unsecured environment 110 is a non-enclave environment where data can be stored in encrypted format. The secure environment 102 includes an asset pair currency exchange 104. The asset pair currency exchange 104 is configured to convert and exchange any currency in a transaction. For example, the exchange 104 can convert Eth from one user's account to Bitcoin in another user's account. Therefore, when clients make requests to perform buy or sell orders, the asset pair currency exchange 104 can complete the requests within the secure environment 102.

The exchange 104 can receive client data 106 and 108 (e.g., client accounts), which are associated with each of the clients that make requests to transact via the enclave exchange. Clients can transact with each other even if they have different digital assets on different blockchains. Thus, the client data 106 and 108 can be received, by the exchange 104, from more than one blockchain.

As illustrated in FIG. 1, the exchange 104 currently includes client 1 data 106 and client 2 data 108 in the form of double ledger tables. Client 1 data 106 is associated with client 118 and client 2 data 108 is associated with client 120. The client data 106 and 108 can include information such as how much of a particular currency the client has (e.g., balance(s) with the exchange), how much of a currency the client received in prior and/or current transactions, and how much of a currency the client spent in prior and/or current transactions. The clients 118 and 120 can deposit digital assets into their accounts, which would be reflected in the data 106 and 108 respectively. These deposits are encrypted with private keys that an operator of the secure environment 102 does not have. As a result, the operator cannot modify or control the clients' deposits or other account information—only the clients 118 and 120 maintain control over their digital assets. Moreover, the operator has no knowledge of the account balances of each client 118 and 120, which is advantageous to ensure that the operator maintains equal and fair trading in the secure environment 102.

In addition, the exchange 104 can permit users (e.g., clients) to deposit and withdraw assets from the user balances. For example, a user may wish to keep a balance in the exchange long-term, and may make a few initial deposits. Another user, though, may wish only to use the exchange for a one-time transaction, in which case a deposit is made from a blockchain 116A, an exchange is made, and the entirety of the resulting asset is deposited in a blockchain 116B.

The unsecured environment 110 includes unsecured memory 112 in which encrypted data objects 114A-N are stored. Because the secure environment 102 has no running memory, or less memory than may be required to run the exchange 104, it is beneficial to store data in the unsecured memory 112 of the unsecured environment 110. This structure allows for the secure environment 102 to more quickly and efficiently perform transactions, verify data, and encrypt and decrypt data. All data that is stored in the unsecured memory 112 is encrypted inside the secure environment 102 and only the secure environment 102 has access to an encryption key.

As illustrated in FIG. 1, the secure environment 102 can receive a MAKE request from the client 1 118 in A. The MAKE request indicates that the client 118 has a currency or other digital asset that they want to convert into another currency or digital asset. In other words, the client 118 wants to make or start a transaction or trade, such as completing a sell order. The client 2 120 can transmit a PURCHASE request to the secure environment 102 in B. The PURCHASE request indicates that the client 120 has the currency or digital asset that the client 118 is requesting and that the device 120 wants to complete the trade offered by the client 118. In other words, the client 120 makes a buy order as a request. Other types of requests can be made to the secure environment 102. Digital assets other than cryptocurrencies can also be exchanged and/or transacted with in the secure environment 102.

As previously described, the asset pair currency exchange 104 can access data from the blockchains 116A and 116B and/or unsecured memory 112 to receive the client data 106 and 108. The clients 118 and 120 can be trading different digital assets that are housed on different blockchains, so it is important that the exchange 104 reconciles such differences to complete the transaction between the clients. In C, the exchange 104 also accesses and reads in the client data 106 and 108, which are stored in the unsecured memory 112. Part of reading in the client data 106 and 108 is validating (e.g., using a signature matching function as described herein, such as in reference to FIG. 4) and decrypting the client data once the data 106 and 108 is received by the secure environment 102. The data 106 and 108 are validated inside the secure environment 102 to ensure that the encryption of the data 106 and 108 and/or the data itself has not been tampered with while in storage outside of the secure environment 102. If the data 106 and 108 have not been tampered with, they can be decrypted using the encryption key that is stored in the secure environment 102. The decrypted data 106 and 108 can now be updated to reflect the transaction between the clients 118 and 120.

Once the client data 106 and 108 is decrypted in the secure environment 102, the exchange 104 can perform the transaction in D. For example, based on the trade established between the clients 118 and 120 (e.g., client 118 requests to sell their Bitcoin for Ether and client 120 requests to buy client 118's Bitcoin with their Ether), the exchange 104 can accordingly adjust currency or other digital asset balances in the client data 106 and 108 associated with the clients 118 and 120.

An operator of the secure environment 102 can probably be prevented from gaining knowledge of the client devices 118 and 120 order (e.g., transaction), whether the order or request of a client has been matched, and whether there is a settlement and/or transfer of digital assets between client accounts. The operator is prevented from gaining this knowledge because the operator does not have access to encryption keys that are used to encrypt data associated with a transaction or order. This is beneficial to ensure that the operator cannot manipulate the order or exchange to the disadvantage of any client. Clients retain control over their digital assets and maintain anonymity while transacting in the secure environment 102.

After the transaction is made in D, the client data 106 and 108 are updated to reflect the transaction, then encrypted (using the same encryption key for the original client data 106 and 108) and written back to the unsecured memory 112 in E for storage. The client data 106 and 108 are then erased from the secure environment 102. As mentioned, the secure environment 102 does not hold onto the updated client data 106 and 108 because the secure environment 102 does not have sufficient running memory for long-term storage. The updated client data 106 and 108 remain encrypted and stored in the unsecured environment 110 until the secure environment 102 needs to access the data 106 and/or 108 for another trade or order. Once the secure environment 102 requests access to the updated client data 106 and/or 108, the data 106 and/or 108 can be read back to the secure environment 102.

Figure 2:
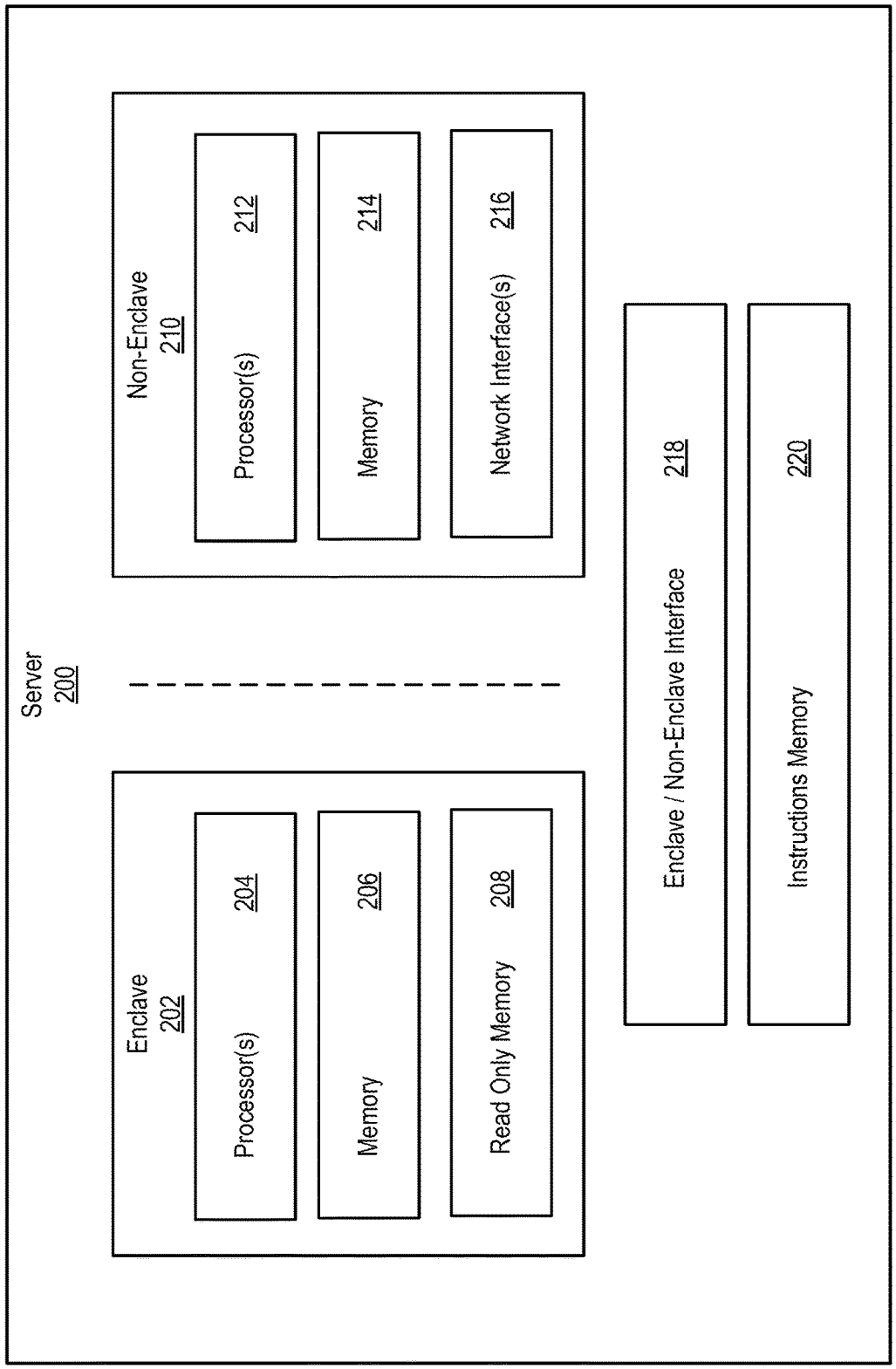
FIG. 2 is a system diagram of an example enclave exchange.

FIG. 2 is a system diagram of an example of hardware that can house an enclave exchange. Server 200 includes both an enclave 202 and a non-enclave 210 (e.g., refer to the secure environment 102 and the unsecured environment 110 in FIG. 1). The enclave can include one or more processors 204, memory 206, and read only memory 208. The non-enclave can include one or more processors 212, memory 214, and one or more network interfaces 216. The server 200 additionally includes an enclave/non-enclave interface 218 and instructions memory 220, both of which can be accessed by the enclave 202 and the non-enclave 210.

Referring to the enclave 202, the processors 204 are configured to perform instructions for operating software (e.g., the enclave exchange software) and storing data. The memory 206 is configured to be inaccessible by the processors 212 of the non-enclave 210 but accessible by the processors 204 of the enclave 202. This is advantageous to ensure security and confidentiality of data that is being accessed and/or manipulated by the enclave 202 when performing client requests. Entities or users outside of the enclave 202 cannot look into the enclave 202. This prevents hackers from targeting the enclave 202 and it also ensures that entities, operators, or other users do not try to manipulate or prevent fair trading in the enclave 202. When settling a transaction and/or transferring assets between different client accounts in the enclave 202, client data is temporarily brought into memory 206. There, and according to instructions performed by the processors 204, the data can be validated, decrypted, updated based on the client request(s), and encrypted before being sent out of the enclave 202 for storage in the memory 214 of the non-enclave 210. Once the client request(s) is completed and the data is sent outside of the enclave 202 for storage, the enclave 202 erases the data that was temporarily brought into the memory 206. As a result, the enclave 202 does not maintain long-term storage and can perform operations associated with client requests and transactions faster. It will be understood that other software types will perform other functions in a similar way.

The read only memory 208 is configured to store an encryption key. The encryption key is only known and accessible by the enclave 202. Since the key is stored in the read only memory 208, the encryption key cannot be modified, even by an operator of the enclave 202. The same encryption key is used by the enclave 202 to (1) encrypt and decrypt original data that is stored in the non-enclave 210 and brought into the enclave 202 and (2) encrypt and decrypt data that is updated in the enclave 202 and sent to the non-enclave 210 for storage. Using the same, unmodifiable encryption key is advantageous to ensure that data is not altered or manipulated while in storage in the memory 214 of the non-enclave 210. The read only memory 208 is also inaccessible by the processors 212 of the non-enclave 210 while being accessible by one or more of the processors 204 of the enclave 202. This is advantageous for the reasons mentioned above and can also allow the operator to make a credible statement that, even if they were motivated to do so, they lack even the ability to tamper with software running in the enclave 202.

Referring to the non-enclave 210, the processors 212 are configured to perform operations within the non-enclave 210, in response to receiving requests or instructions from the enclave 202. The memory 214 stores encrypted data objects (e.g., refer to the unsecured memory 112 and the client data 106 and 108 in FIG. 1). As a result, the encrypted data objects associated with clients is not stored in the enclave 202, but rather is encrypted by the enclave 202, stored remotely in the non-enclave 210, and requested and accessed by the enclave 202. The memory 214 is further configured to permit access by one or more processors 204 of the enclave 202. Finally, the network interfaces 216 provides for communication between one or more of the components described herein. In other examples, some elements may reside in remote machines. For example, the server 200 may use remote data storage to augment or replace the memory 214.

Network interfaces 216 provide the server 200 with access to one or more data networks. For example, the network interfaces 216 may provide access to remote devices over local networks, the Internet, etc. This may include, for example, high-bandwidth connections with other devices in the same data-center, on the same server rack, etc.

The enclave/non-enclave interface 218 provides for read and write permissions to both the enclave 202 and the non-enclave 210. The interface 218 also provides for communication between the enclave 202 and the non-enclave 210.

The instructions memory 220 is configured to store instructions that, when executed by the enclave processors 204 cause the processors 204 to perform one or more of the operations and/or processes. The instructions memory 220 can store source code for an exchange that runs on the server 200. The non-enclave 210, therefore, can have write permissions since the non-enclave 210 gets the source code from an external source outside the server 200. The non-enclave 210 can have optional read permissions for the instructions memory 220. The enclave 202 can have read permissions for the instructions memory 220. The enclave 202 needs to read instructions for running and operating the exchange. The enclave 202 can have optional write permissions since the enclave 202 is not in charge with writing the source code.

Figure 3:
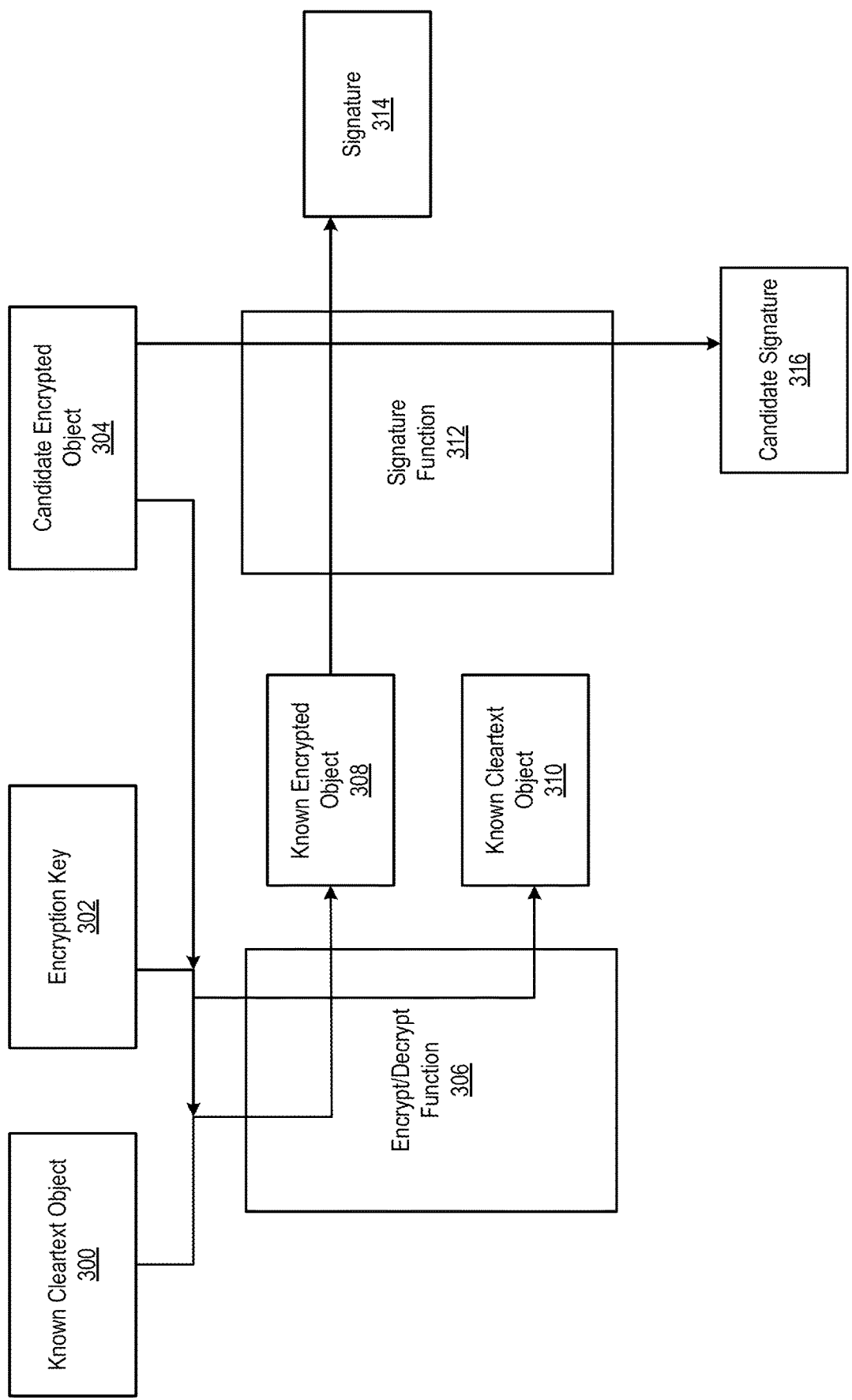
FIG. 3 is a schematic diagram of data flow for enclave data storage.

FIG. 3 is a schematic diagram of data flow for enclave data storage. The data flow depicted can occur within an enclave exchange environment, as described throughout this disclosure. A known cleartext object 300 is generated, such as after it has been updated to reflect completion of a client request. The known cleartext object 300 can include client account information as described herein (e.g., refer to FIG. 1). Using encryption key 302, the known cleartext object 300 is encrypted via an encrypt/decrypt function 306 in the enclave. As a result of the encryption function 306, a known cleartext object 310 and known encrypted object 308 are generated. The known cleartext object 310 is a copy of the known cleartext object 300. Since the enclave does not have enough memory to store the known cleartext object 300 long term, the known cleartext object 300 is deleted from memory in the enclave. This results in a period of time without access to the known cleartext object 300. Later, the enclave can request a copy, and will gain access to its copy, the known cleartext object 310.

A signature 314 can be generated for the known encrypted object 308 using a signature function 312. The signature function 312 can be a Merkle tree generator, which is configured to reliably generate the same root node of a Merkle tree when operating on the same input. Using the Merkle tree to generate signatures inside the enclave and then verifying or matching the signatures therein is advantageous to provide for a reliable, safe, and immutable exchange environment. For example, a remote client can send a request to the enclave exchange and verify whether the exchange is in fact running in the enclave. The remote client can receive from the exchange a hash or other signature of the exchange and verify whether it matches the publicly available hash. If the hashes are identical, then it is verified that the exchange is safe and the operator is not malicious.

The signature 314 can be a root node of the Merkle tree. Once the signature 314 is generated, the enclave can send the known encrypted object 308 for storage in memory of a non-enclave, as described herein. The enclave stores the associated signature 314 in memory of the enclave. That signature 314 can then be used later by the enclave to validate associated data that is requested from storage in the non-enclave.

The enclave can receive a candidate encrypted object 304 from the non-enclave memory in response to a request for return of the known encrypted object 308. The candidate encrypted object 304 and the known encrypted object 308 should be identical. So, a candidate signature 316 is generated on this input via the signature function 312. If the input is in fact identical, then the candidate signature 316 would be the same root node of the Merkle tree as the signature 314. The enclave compares the candidate signature 316 with the signature 314 to determine whether they match. If the signatures match, then the data has not been tampered with while it was in storage in the non-enclave. The candidate encrypted object 304 can then be decrypted and used to perform requests in the enclave.

Figure 4:
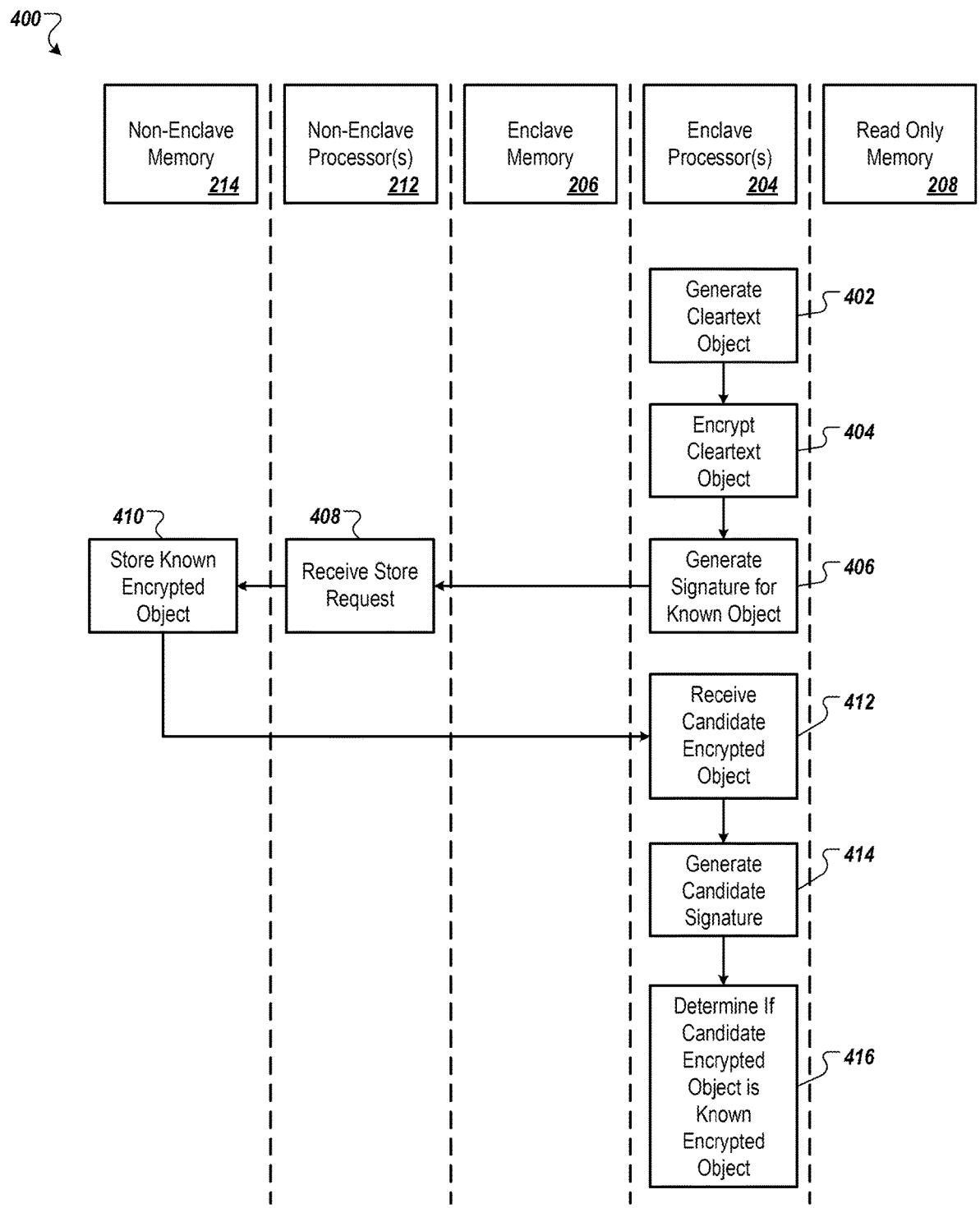
FIG. 4 is a swimlane diagram of a process for storing enclave data.

FIG. 4 is a swimlane diagram of a process 400 for storing enclave data. The process 400 can be used, for example, with the non-enclave memory 214, the non-enclave processors 212, the enclave memory 206, the enclave processors 204, and the read only memory 208, as described with respect to FIGS. 1-3 and as such will use elements of FIGS. 1-3 in the description of the process 400. However, another system or systems can be used to perform the process 400 or another similar process.

A cleartext object is generated in 402. For example, the enclave processors 204 can be configured to perform operations comprising generating a cleartext object. The cleartext object can be a ledger or any other data structure or data that will be processed on and/or part of a transaction in the enclave exchange. The cleartext object can be associated with a client that is making a request to the enclave exchange. The enclave processors 204 can also generate multiple cleartext objects, wherein each cleartext object is associated with a different client.

The cleartext object is encrypted in 404. For example, the enclave processors 204 can be configured to perform operations comprising encrypting the cleartext object with an encryption key to generate a known encrypted object. Encrypting the object means that no other entity can figure out what data/information is in the cleartext object. Client data is therefore protected from outsiders looking in and the client maintains control over their data. The encryption key is kept in the enclave exchange. The encryption key is not provided to the non-enclave processors 212 with the encrypted cleartext object. This ensures that the encryption key cannot be modified by external entities nor an operator of the enclave exchange. This also ensures that the cleartext object is protected from hacking when it is stored in an external, unsecure environment like the non-enclave 210 depicted and described in reference to FIG. 2. As described throughout, the same encryption key can be used for encrypting and decrypting an original cleartext object and an updated cleartext object, which is beneficial for validating data once it is received in the enclave.

Next, a signature for the known object is generated in 406. For example, enclave processors 204 can be configured to perform operations comprising generating a known signature for the known encrypted object using a particular signature-function. The particular signature-function is a Merkle tree generator. The known signature is a root node of a Merkle tree. The Merkle tree generator is configured to reliably generate the same root node of the Merkle tree when operating on the same input. Therefore, validating data when it is received by the enclave can be quickly and easily performed by comparing a root node of the received data to a root node of the known encrypted object. If the root nodes are identical, then the data was not altered or compromised while stored outside of the enclave. Therefore, running the Merkle tree inside the enclave is advantageous to validate data and determine whether data stored outside of the enclave has been modified in any way. As will be understood though, other processes to validate the data may be used.

A STORE request can be transmitted by the enclave processors 204 to the non-enclave processors 212 in 408. For example, the enclave processors 204 can be configured to perform operations comprising providing the known encrypted object for storage in the non-enclave memory 214. As described throughout this disclosure, the known encrypted object is stored outside of the enclave in unsecured memory 214 of the non-enclave (e.g., unsecured environment) in 410. Because the known encrypted object is stored outside of the enclave, the enclave does not keep a copy of the known encrypted object.

At a later time, such as when a client makes a request to sell assets, candidate encrypted object is received in 412. For example, the enclave processors 204 can be configured to perform operations comprising receiving, after providing the known encrypted object, a candidate encrypted object from the non-enclave memory in response to a request for return of the known encrypted object. The candidate encrypted object can include client data that is associated with the client making the request. However, before the candidate encrypted object can be used to complete the client request, the candidate encrypted object must be verified/validated to ensure that it is a known encrypted object that has not been tampered with or modified in any way while in storage outside of the enclave.

Once the candidate encrypted object is received in 412 from the non-enclave memory 214, a candidate signature is generated in 414. For example, the enclave processors 204 can be configured to perform operations comprising generating a candidate signature of the candidate encrypted object using the particular signature-function. As described above, the particular signature-function is the Merkle tree. The enclave does not assume that the candidate encrypted object is accurate or the same as the known encrypted object until generating the candidate signature in 414. This is to ensure that the candidate encrypted object and/or the known encrypted object have not been tampered with by entities external to the enclave. Using the Merkle tree, the candidate signature should be an identical root node as the root node of the signature for the known encrypted object because the candidate encrypted object should be identical input into the Merkle tree generator as the known encrypted object.

Next, it can be determined if the candidate encrypted object is the same as the known encrypted object in 416. For example, the enclave processors 204 can be configured to perform operations comprising determining if the candidate encrypted object is the known encrypted object based on a comparison of the known signature with the candidate signature. The Merkle tree generator is configured to reliably generate the same root node of a Merkle tree when operating on the same input. Thus, the candidate signature and the known signature should be the same. Upon a determination that the known signature and the candidate signature are identical, the enclave processors 204 can be further configured to perform operations comprising determining that the candidate encrypted object is the known encrypted object. If the signatures are not identical, then the candidate encrypted object is not the known encrypted object. Thus, upon a determination that the known signature and the candidate signature are not identical, the processors 204 can be further configured to perform operations comprising determining that the candidate encrypted object is not the known encrypted object.

Finally, although not illustrated in FIG. 4, the enclave processors 204 can be further configured to perform operations comprising decrypting the candidate encrypted object with the encryption key once determining that the candidate signature and the known signature are identical. In other words, once the processors 204 determine that the candidate signature and the known signature are identical, the processors 204 can decrypt the candidate encrypted object. The decrypted candidate object can then be used to complete the client request(s) in a transaction in the enclave exchange.

Figure 5:
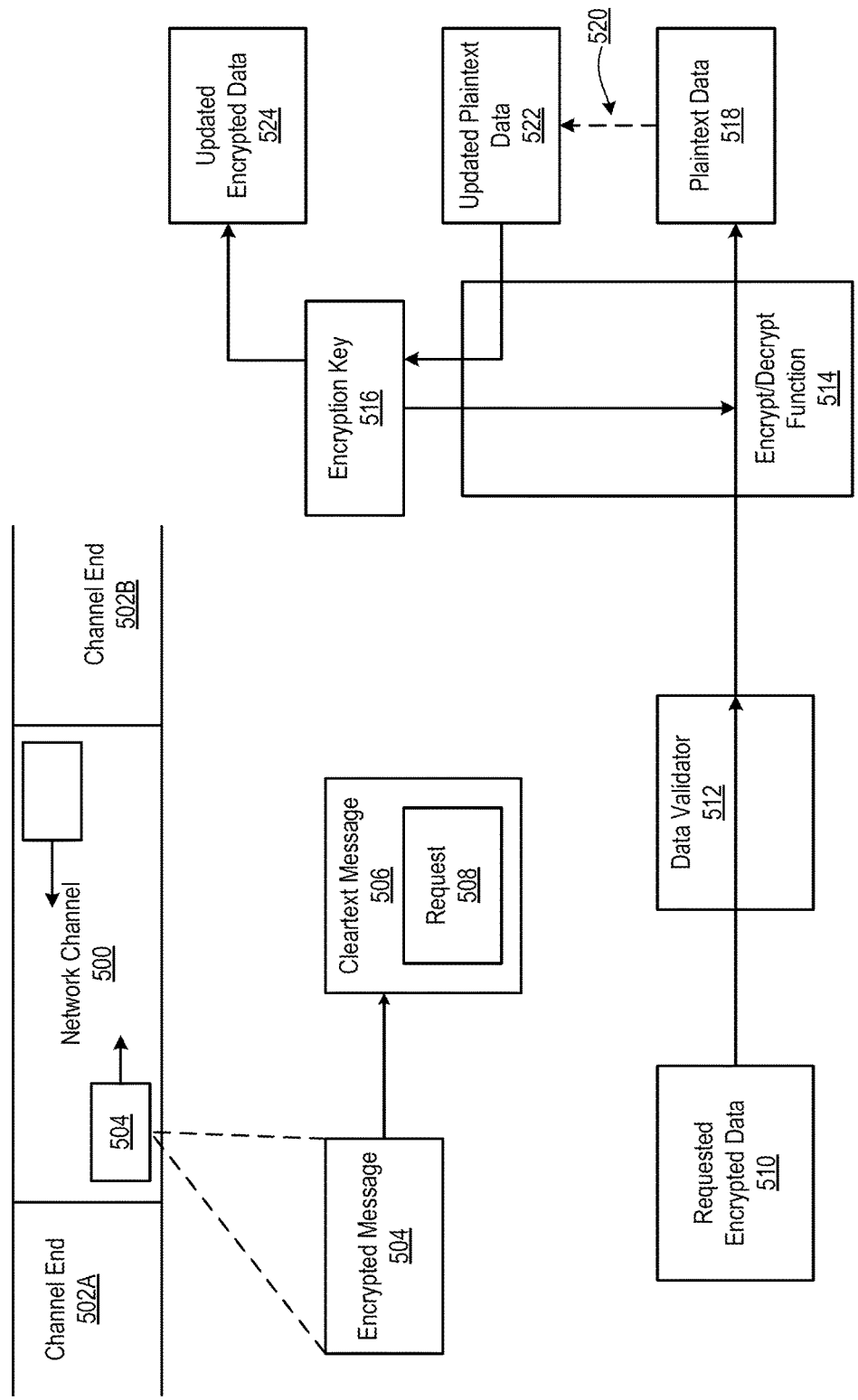
FIG. 5 is a schematic drawing of data flow for operating an exemplary cryptocurrency enclave exchange.

FIG. 5 is a schematic drawing of data flow for operating an exemplary cryptocurrency enclave exchange. The same hardware described in reference to FIG. 2 can be implemented to operate the exemplary cryptocurrency enclave exchange. The exemplary exchange includes a network channel 500 having channel ends 502A and 502B. The channel end 502A can be within an enclave computing environment (e.g., refer to the enclave 202 in FIG. 2 and the secure environment 102 in FIG. 1). The channel end 502B can be located at a client device (e.g., refer to clients 118 and 120 in FIG. 1). The network channel 500 can receive requests from the client device via the channel end 502B and send requests and encrypted messages, such as encrypted message 504, in both directions via the channel ends 502A and 502B.

The network channel can have a Secure Sockets Layer (SSL) connection. The SSL connection can terminate once inside the enclave such that unsecured processors (e.g., the non-enclave processors 212 in FIG. 2) cannot see into the SSL connection. This configuration is advantageous to ensure that data is secure during transfers and transactions using the enclave exchange. The network can also have a variety of other connection techniques to secure data and messages that are transferred between the channel ends 502A-B, such as a Transport Layer Security (TLS) protocol.

The network channel 500 can encrypt a cleartext message 506 that is received from the client device. As a result, the cleartext message 506 is inaccessible to the non-enclave processors. The encrypted message 504 includes the cleartext message 506 and a request 508. The cleartext message 506 is a message from the client device to the enclave that indicates a cryptocurrency exchange. The request 508 can include a MAKE, PURCHASE, BUY or SELL request, for example, as described in reference to FIG. 1. The request 508 is required such that the enclave exchange can perform/complete a transaction for the client device.

Encrypted data 510 includes data for an account (e.g., balances) associated with the request 508 Therefore, the requested encrypted data 510 may be requested based on the request 508. Once the data 510 is inside the enclave, the data 510 can go through a data validator 512. A validation process, such as process 400 described in reference to FIG. 4, can be performed on the data 510. The data validator 512 ensures that the data is in fact what it is purported to be and has not been tampered with while stored outside of the enclave. Once validated, the data 510 goes through an encrypt/decrypt function 514 in the enclave. The enclave decrypts the encrypted data 510 in the function 514 using an encryption key 516. As described throughout this disclosure, only the enclave maintains the encryption key 516.

Decrypting the data 510 results in generating plaintext data 518. The plaintext data 518 includes account information associated with a client that made a request or is part of a transaction (e.g., refer to client data 106 and 108 in FIG. 1). The plaintext data 518 can be read and used in transaction 520. For example, the request 508 can be a MAKE request, in which the client wants to trade one currency for another. The request 508 can be read in the plaintext data 518 such that the enclave can complete the request 508 in the transaction 520 (e.g., trading the one currency for another). Once the transaction 520 is completed, the plaintext data is updated into updated plaintext data 522. For example, a double ledger table of data associated with the client can be updated to reflect changes made to the client's account balance based on the transaction 520, as described in reference to FIG. 1.

The updated plaintext data 522 is encrypted using the same encryption key 516 via the function 514. As a result, updated encrypted data 524 is generated. The updated encrypted data 524 can then be stored in non-enclave unsecure memory, as described in reference to FIGS. 1-4.

Figure 6A:
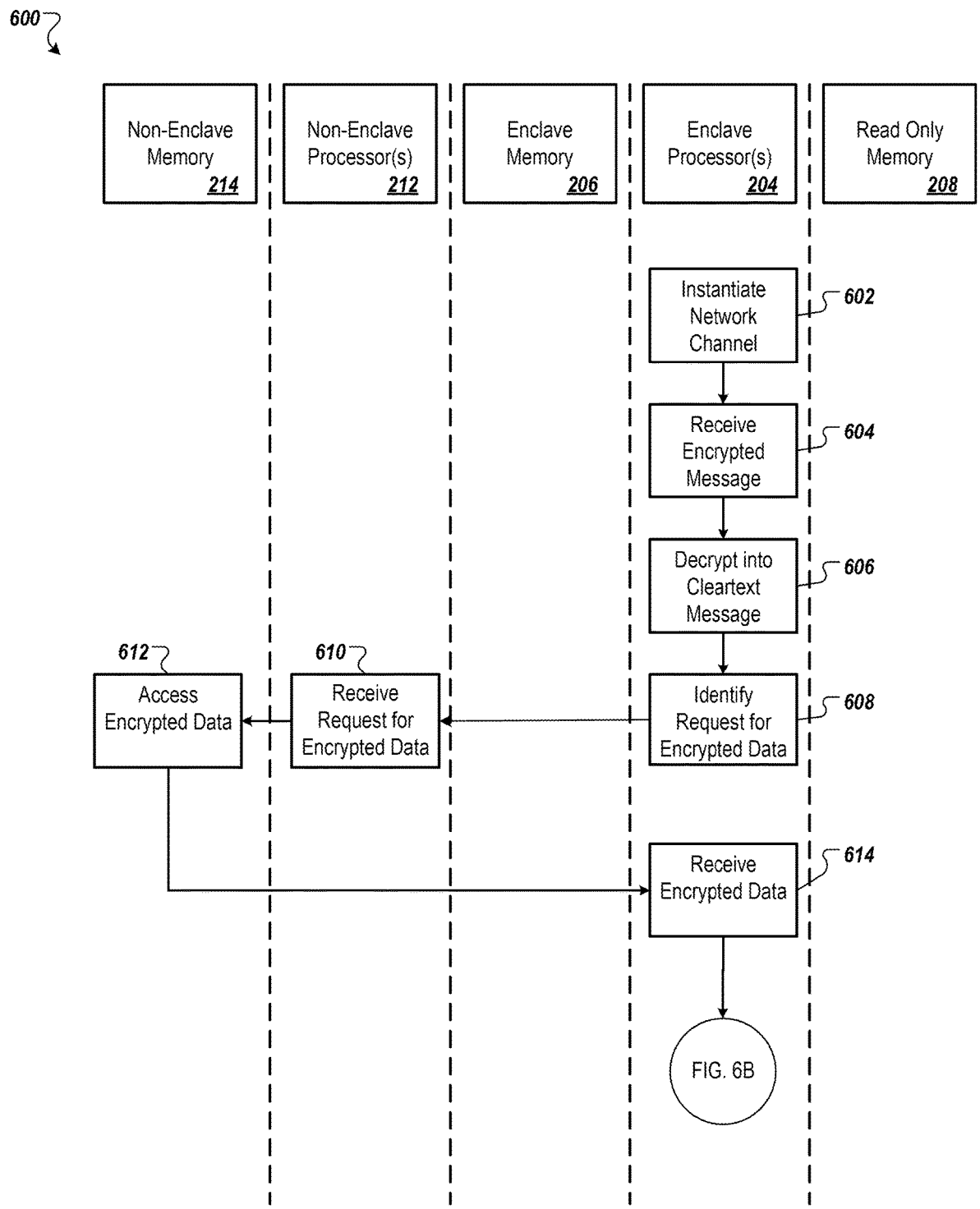
FIGS. 6A-B are a swimlane diagram of a process for operating the exemplary cryptocurrency enclave exchange.
Figure 6B:
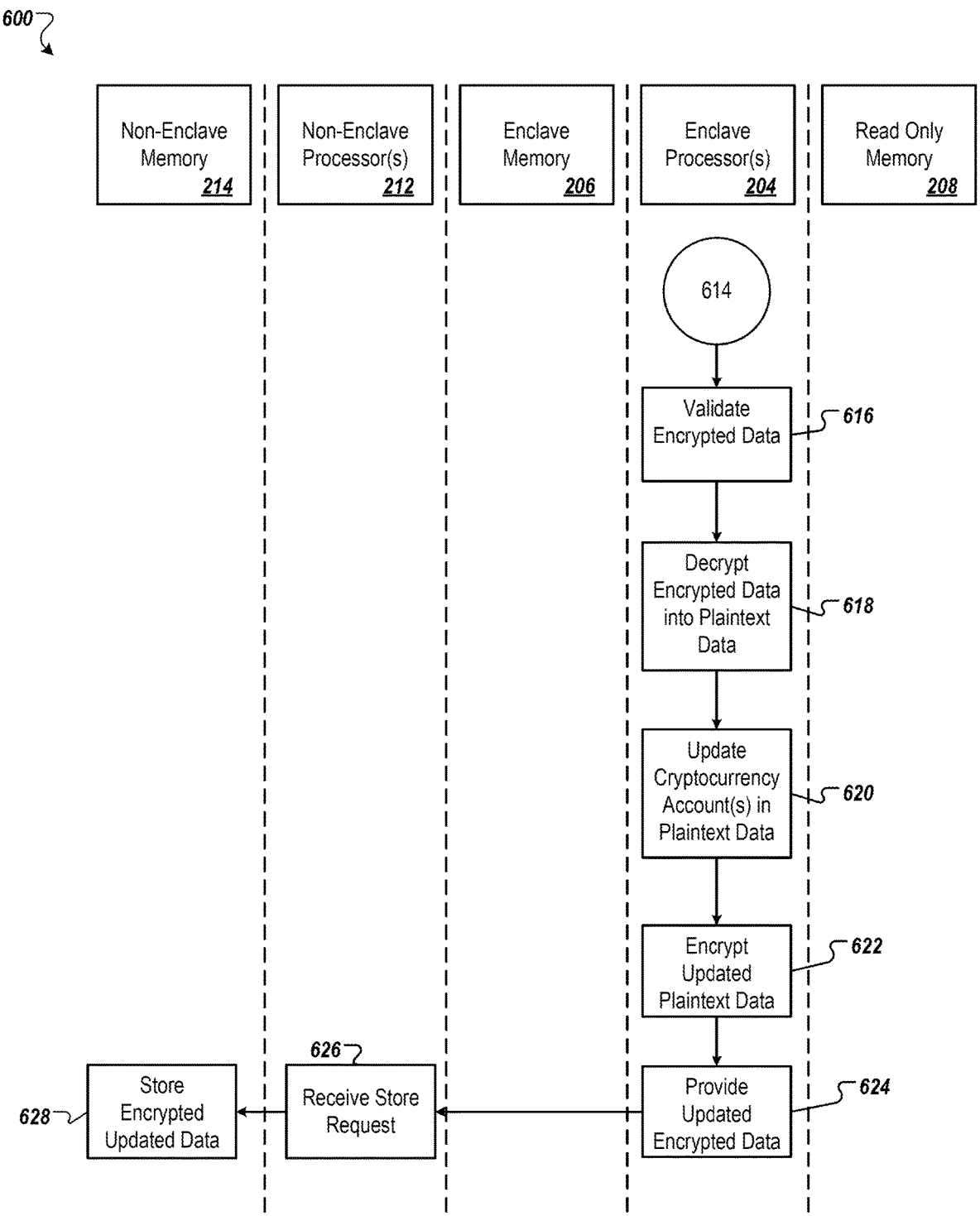

FIGS. 6A-B are a swimlane diagram of a process 600 for operating the exemplary cryptocurrency enclave exchange. The process 600 can be used, for example, with the non-enclave memory 214, the non-enclave processors 212, the enclave memory 206, the enclave processors 204, and the read only memory 208, as described with respect to FIGS. 1-5 and as such will use elements of FIGS. 1-5 in the description of the process 600. However, another system or systems can be used to perform the process 600 or another similar process.

Referring to the process 600 in FIGS. 6A-B, a network channel is instantiated in 602. For example, the enclave processors 204 can be configured to perform operations comprising instantiating a network channel having a first end within the enclave computing environment and a second end at a client device. The network channel is configured to encrypt cleartext messages upon entry into the network channel. As a result, the network channel generates encrypted messages such that the cleartext messages are inaccessible to the non-enclave processors 212. In 602, a connection such as an SSL connection can be established. The connection can terminate inside the enclave. The unsecured processors 212 then cannot see into the connection, which ensures confidentiality and security of data associated with requests and transactions occurring within the enclave exchange.

An encrypted message is received in 604. For example, the enclave processors 204 can be further configured to perform operations comprising receiving encrypted messages from a client device through the network channel. The enclave processors 204 receive an SSL message, which is the encrypted message generated in the network channel upon receiving the cleartext message from the client device.

The encrypted message is decrypted into a cleartext message in 606. For example, the enclave processors 204 can be further configured to perform operations comprising decrypting the encrypted messages to generate cleartext messages. The cleartext message, as described in reference to FIG. 5, includes a request to perform some action in a transaction. The cleartext message is essentially a message from the client device asking the enclave to perform a cryptocurrency exchange on behalf of the client.

Thus, a request for encrypted data is identified in 608. For example, the enclave processors 204 can be further configured to perform operations comprising identifying a request in the cleartext messages. As described throughout, the request can be a MAKE request, in which the client device establishes that it wants to make or start a cryptocurrency trade (e.g., sell its cryptocurrency). The request can also be a PURCHASE request, in which the client device establishes that it wants to complete the cryptocurrency trade (e.g., but another client's cryptocurrency).

The non-enclave processors 212 receive the request for the encrypted data in 610. For example, the enclave processors 204 can be further configured to perform operations comprising requesting encrypted data stored in the non-enclave memory 214 for the request. The request in the cleartext message can include an ID or other form of identification that links or associates the request with a particular client. This ID can be sent in the request to the non-enclave processors 212 such that the processors 212 know what encrypted data to collect and return to the enclave.

The encrypted data is accessed in 612 in the non-enclave memory 214. As mentioned, the appropriate encrypted data is accessed based on the corresponding identification received in the request for encrypted data in 610. The encrypted data can then be transmitted to the enclave processors 204. The enclave processors 204 receive the requested encrypted data in 614. For example, the enclave processors 204 can be further configured to perform operations comprising receiving the encrypted data from the non-enclave memory 214.

The encrypted data is validated in 616. For example, the enclave processors 204 can be further configured to perform operations comprising validating the encrypted data as untampered. Validating the encrypted data can be accomplished using the process 400 as described in reference to FIG. 4. For example, a signature of the encrypted data can be checked against a signature of candidate data using a Merkle tree to determine whether the signatures are identical. If the signatures are identical, then the encrypted data is deemed untampered.

Once validated, the encrypted data is decrypted into plaintext data in 618. For example, the enclave processors 204 can be further configured to perform operations comprising decrypting, after validating the encrypted data, the encrypted data to generate plaintext data. Decrypting the data results in accessing information about the client's account, including but not limited to a current balance on the account, a type of currency on the account, and any authorizations to perform the cryptocurrency exchange. The client information can then be used to perform/complete client request(s) in the transaction.

The cryptocurrency account information in the plaintext data can be updated in 620. For example, the enclave processors 204 can be further configured to perform operations comprising updating, based on the request, at least one cryptocurrency account in the plaintext data to generate updated plaintext data. The processors 204 complete the transaction (e.g., order) based on satisfying the requests of one or more clients that are involved in the transaction. As an example, the processors 204 can decrease a balance on one account and increase a balance on another account where the clients of the corresponding accounts have agreed to the transaction (e.g., one client made the sell request and the other client made the buy request). Any other functions that are part of a cryptocurrency exchange can occur in 620.

The updated plaintext data is encrypted in 622. For example, the enclave processors 204 can be further configured to perform operations comprising encrypting the updated plaintext data to generate updated encrypted data. As a result, the updated plaintext data can be securely moved from the enclave and stored outside of the enclave. A same encryption key that was used for encrypting and decrypting the original encrypted data can be used again to encrypt the updated plaintext data. Using the same encryption key ensures that the data is not modified or altered while stored outside of the enclave.

The updated encrypted data is provided to the non-enclave processors 212 in 624. For example, the enclave processors 204 can be further configured to perform operations comprising providing the updated encrypted data for storage in the non-enclave memory 214. As described throughout, the corresponding encryption key remains stored in the read only memory 208 of the enclave.

The non-enclave memory 214 receives a store request from the enclave processors 204 in 626. The encrypted updated data is then received from the enclave processors 204 and stored in the non-enclave memory 214 in 628. The encrypted updated data remains in storage outside of the enclave until the data is part of a cryptocurrency transaction request in the enclave.

Figure 7:
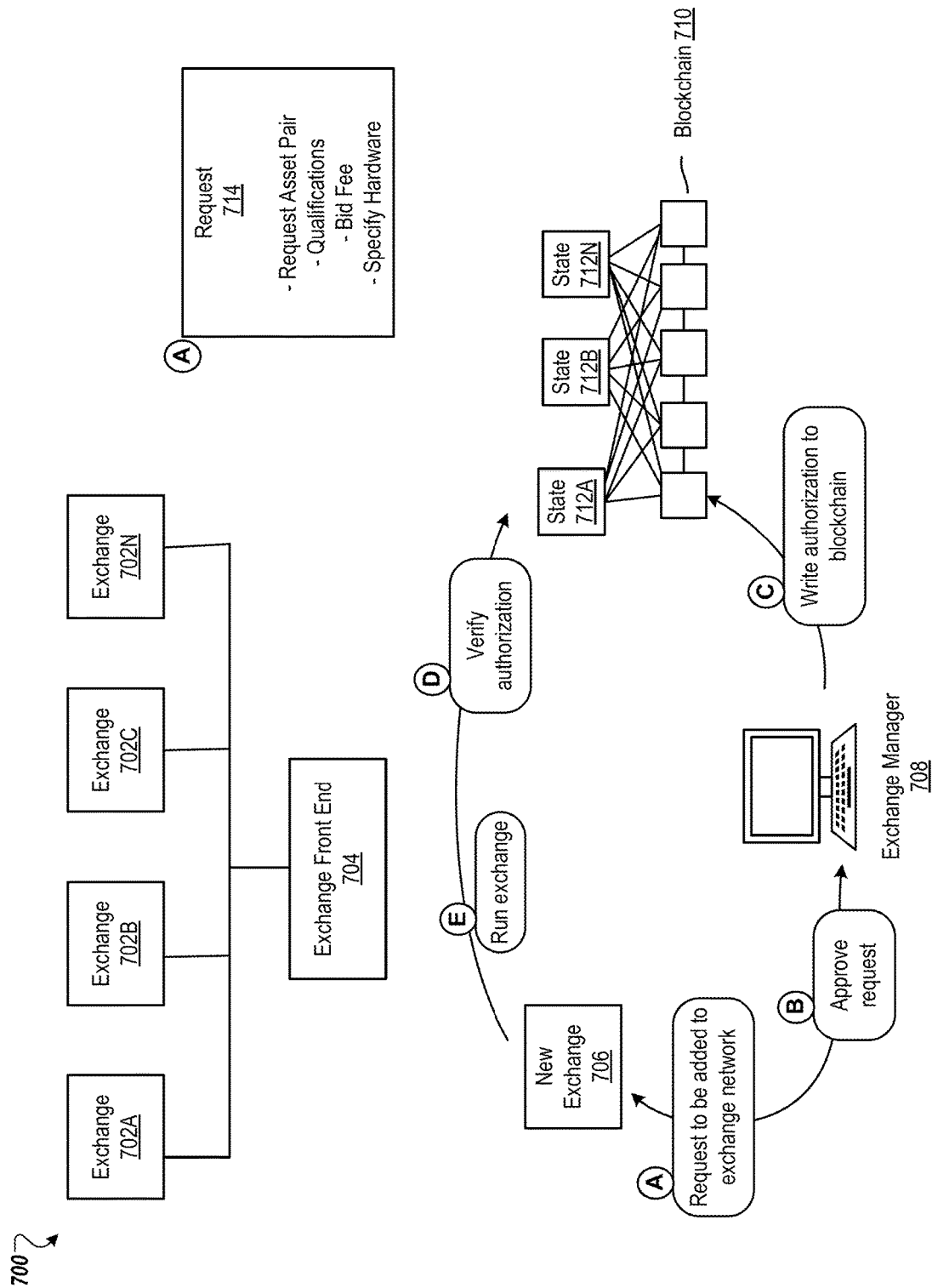
FIG. 7 is a conceptual diagram of a distributed trusted cryptocurrency enclave exchange.

FIG. 7 is a conceptual diagram of a distributed trusted cryptocurrency enclave exchange. A network 700 can include exchanges 702A-N connected to an exchange front end 704. Each of the exchanges 702A-N can be associated with different asset pair(s). One or more of the exchanges 702A-N can also be associated with the same asset pair(s). The exchange front end 704 can provide a web server to clients at client computing devices. A client can request to exchange currencies by providing an asset pair to the front end 704. The front end 704 can then return to the client's computing device the exchanges 702A-N for the particular asset pair. The front end 704 can return the exchanges 702A-N in an order based on one or more conditions, such as which exchange offers a best price, which exchange has a better equity price, and/or a volume of the currency held by the exchange.

As illustrated, a new exchange 706 can be instantiated and added to the network 700. For this to happen, an entity (e.g., client) requests to be added to the exchange network in A. A request 714 can include a request to run the new exchange 706 in relation to a particular asset pair (e.g., Bitcoin-Ether exchange). The request 714 can also include a listing of qualifications that the entity satisfies in order to be able to run the new exchange 706. The request 714 also includes a bid fee, which is an amount that the entity has to pay in order to run the new exchange 706 once the request is approved. Moreover, the request 714 can specify what hardware(s) will be used by the entity to support and host the new exchange 706.

An exchange manager 708 reviews the request from the new exchange 706 and approves the request in B. As described herein (e.g., refer to FIGS. 8, 9A-B), the exchange manager 708 approves the request based on whether the entity seeking to run the new exchange 706 meets certain predetermined qualifications that may be universally applied or conditionally applied (e.g., entities must show compliance with local regulations, which will change depending on the jurisdiction). If the qualifications are met and the entity pays the bid fee to run and operate the new exchange 706, then the entity's request is approved in B.

Once approved, the manager 708 writes, to blockchain 710, authorization for the entity associated with the new exchange 706 in C. As a result of writing authorization into the blockchain 710, the entity is permitted to run the new exchange 706, subject to verification.

Authorization is verified in D. Verifying authorization is important to ensure that the entity has permission to run the exchange software for the new exchange 706. To verify authorization, one or more states 712A-N of the blockchain 710 can be requested by the manager 708 and received from state-servers on the blockchain. The request can be encrypted using TLS, SSL, or another security protocol. The state-servers can be independent entities or client blockchain nodes that run open source code. For example, the state-servers can be oracles. The states 712A-N can be compared by the manager 708 to determine whether a predetermined number of the states 712A-N list the entity of the new exchange 706 as authorized to run the exchange and its associated software. In some examples, the manager 708 can challenge the entity of the new exchange 706 to sign a message with the entity's private key (e.g., Entity ID) that is associated with the asset pair ID. If the signature matures, then the manager 708 can confirm that the entity is trusted and authorized to run the new exchange 706. Once the authorization is verified, the entity can run the new exchange 706 in E.

Figure 8:
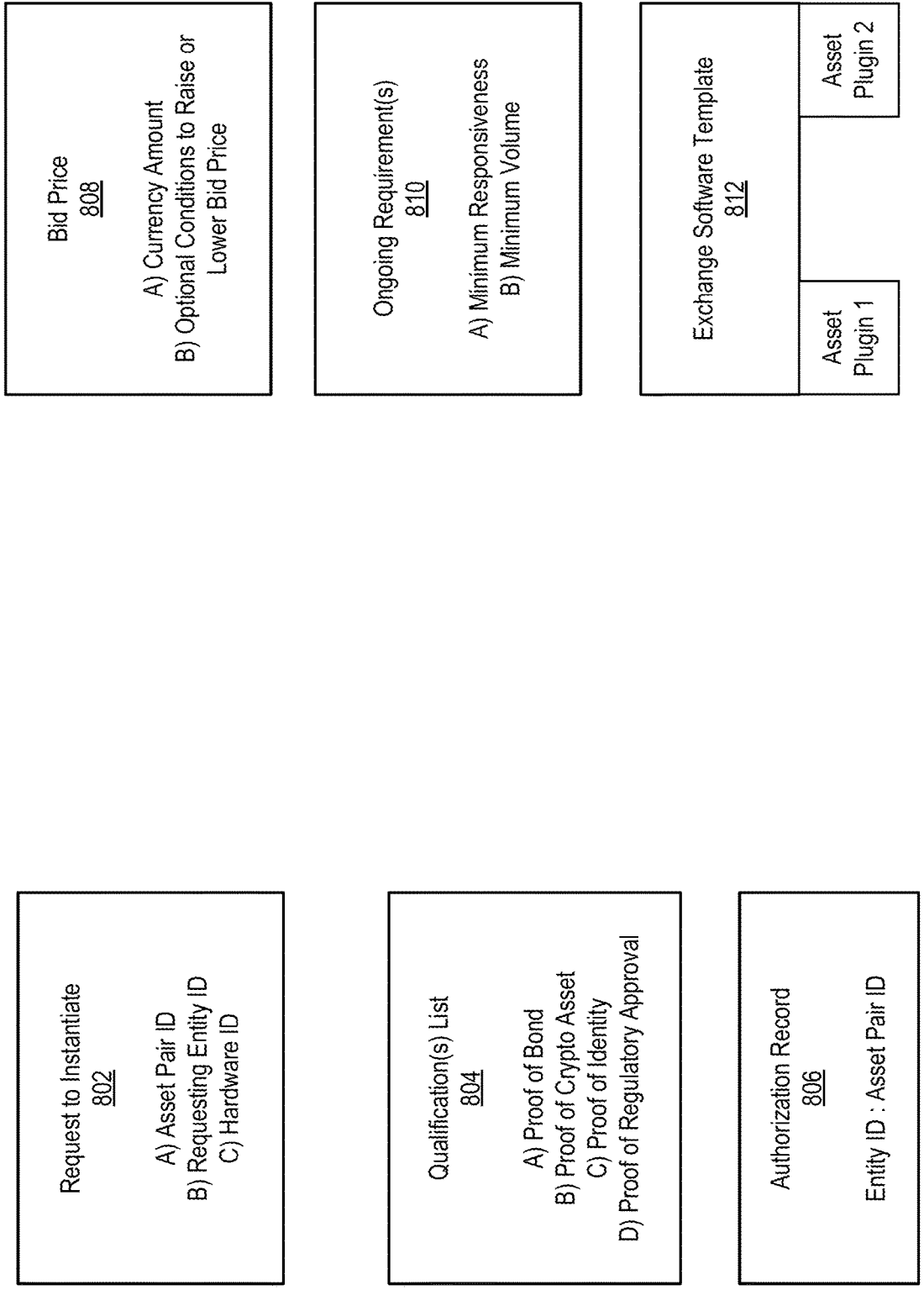
FIG. 8 is a conceptual diagram of data objects of the cryptocurrency enclave exchange.

FIG. 8 is a conceptual diagram of data objects of the cryptocurrency enclave exchange described herein. Data objects that are involved in the cryptocurrency enclave exchange include request to instantiate 802, qualification(s) list 804, bid price 808, authorization record 806, ongoing requirement(s) 810, and exchange software template 812.

The request to instantiate 802 data object can include any one or more of an asset pair ID, a requesting entity ID, and a hardware ID. As described in reference to FIG. 7, when an entity (e.g., client) requests to run a new exchange, the entity's request must identify itself as well as what type of exchange the entity wants to run. This identification information can later be used to identify and/or associate the entity with an exchange that the entity is authorized to run and operate.

The qualification(s) list 804 data object can include any one or more of a proof of bond, a proof of crypto asset, a proof of identity, and a proof of regulatory approval. Before the entity can become authorized to run the new exchange, it must meet certain qualifications. The qualifications act as a form of hurdle that the entity must overcome to ensure that the entity is serious and able to run the exchange. Moreover, requiring the entity to qualify prevents parties from spamming the network. It disincentives parties from acting maliciously in the exchange and/or the network. Furthermore, a qualification such as a bond can be used to compensate users of the exchange who lose funds due to negligence of the entity that operates the exchange, unforeseen problems, etc.

As mentioned, the entity may need to acquire a bond and prove that it has the bond. As another example, the entity can provide signature proof of ownership of crypto asset. As yet another example, the entity can provide cryptographic proof of a currency that the entity has in a physical bank. The qualification list 804 can also include a request that the entity stake a certain amount of an exchange token.

The authorization record 806 data object can include a pairing of an entity ID to an asset paid ID. In other words, the record 806 indicates that the entity is authorized to run the exchange with regards to the particular asset pair. The authorization record 806 can be stored on the blockchain, requested by the enclave, and accessed through states of the blockchain that are served by state-servers (e.g., oracles) in order to verify that the entity is authorized to run the exchange. In some examples, any other form of identification or signature of the entity (e.g., IP addresses) can be used to link the entity to the exchange it is authorized to run. The authorization record 806 can be added to a registry that holds addresses associating each exchange to each operating entity. That registry can be stored on the blockchain.

The bid price 808 data object can include one or more of a currency amount and optional conditions to raise or lower a bid price. As described herein, once the entity meets qualifications to run the new exchange, the enclave can determine the bid price that the entity would have to pay to run the new exchange. The bid price can be based on a variety of factors, including but not limited to conditions in a market for the asset pair that the entity wants to cover in the new exchange. The bid price can be dynamically and automatically updated based on marketplace conditions as an inverse function of a current liquidity available. For example, where many entities want to run exchanges for a particular asset pair, the bid price for that particular asset pair can be raised higher than an asset pair that fewer entities want to run through an exchange. As a result, the asset pairs having less interest of entities can have lower bid prices to promote entities to invest in running exchanges for those asset pairs.

The ongoing requirement(s) 810 data object can include one or more of minimum responsiveness and minimum volume. In other words, once the entity is authorized to and runs the new exchange, the entity is required to satisfy minimum requirements to maintain its authorization to run the exchange. The purpose is to prevent entities from sitting on the exchange, causing disturbances or poor service, and making more overhead for the other exchanges operating within the network. Minimum responsiveness can require the entity to respond to and complete transactions in the exchange within predetermined timeframes. Minimum volume can require the entity to perform a certain number of transactions or transactions total a certain number of tokens over a predetermined amount of time. Where an entity does not meet any one of the ongoing requirement(s) 810, or a given number thereof, the entity's privilege/authorization to run and operate the exchange can be revoked. Moreover, the entity can be required to satisfy the ongoing requirement(s) 810 periodically and/or over a predetermined period of time.

The exchange software template 812 includes asset plugin 1 and asset plugin 2. The software template 812 is then used to run and operate the new exchange. When the entity is authorized to run the exchange for an asset pair, each of the asset signatures can be automatically added to the template 812 via the plugins 1 and 2. The asset signatures are already known and/or accessible on the blockchain, so they can be automatically added to the template 812. Where the entity's asset pair is between a known currency and a new currency (e.g., a currency developed by the entity), then the entity can input a signature for the new currency. The signature for the known currency can be automatically inputted into one of the plugins 1 or 2. The exchange software template 812, on the other hand, may include asset-intendent instructions for the exchange, such as how to communicate with clients, how to connect to the exchange front end 704, how to match two traders, etc.

Figure 9A:
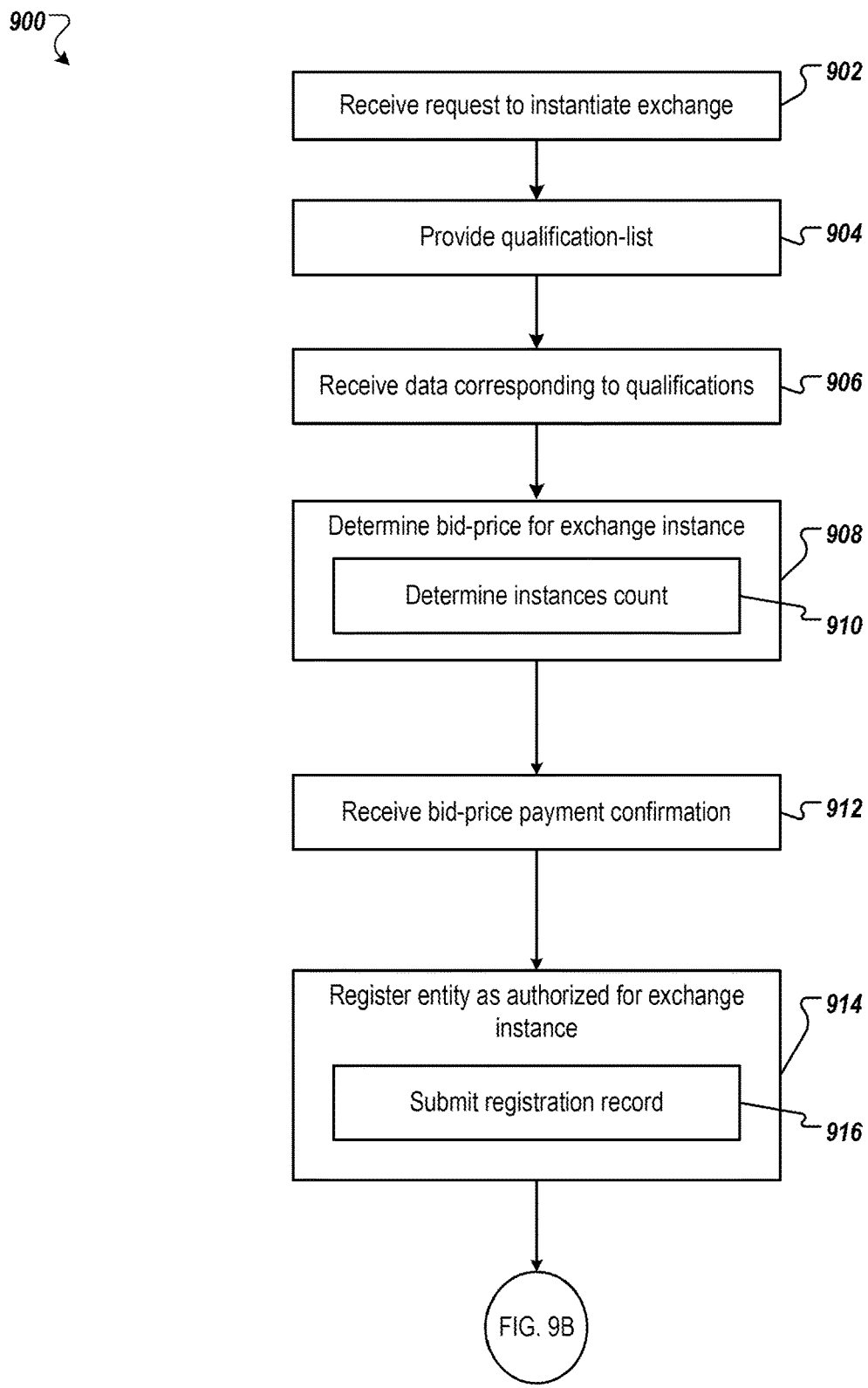
FIGS. 9A-B are a flowchart of a process for generating instances of the cryptocurrency enclave exchange.
Figure 9B:
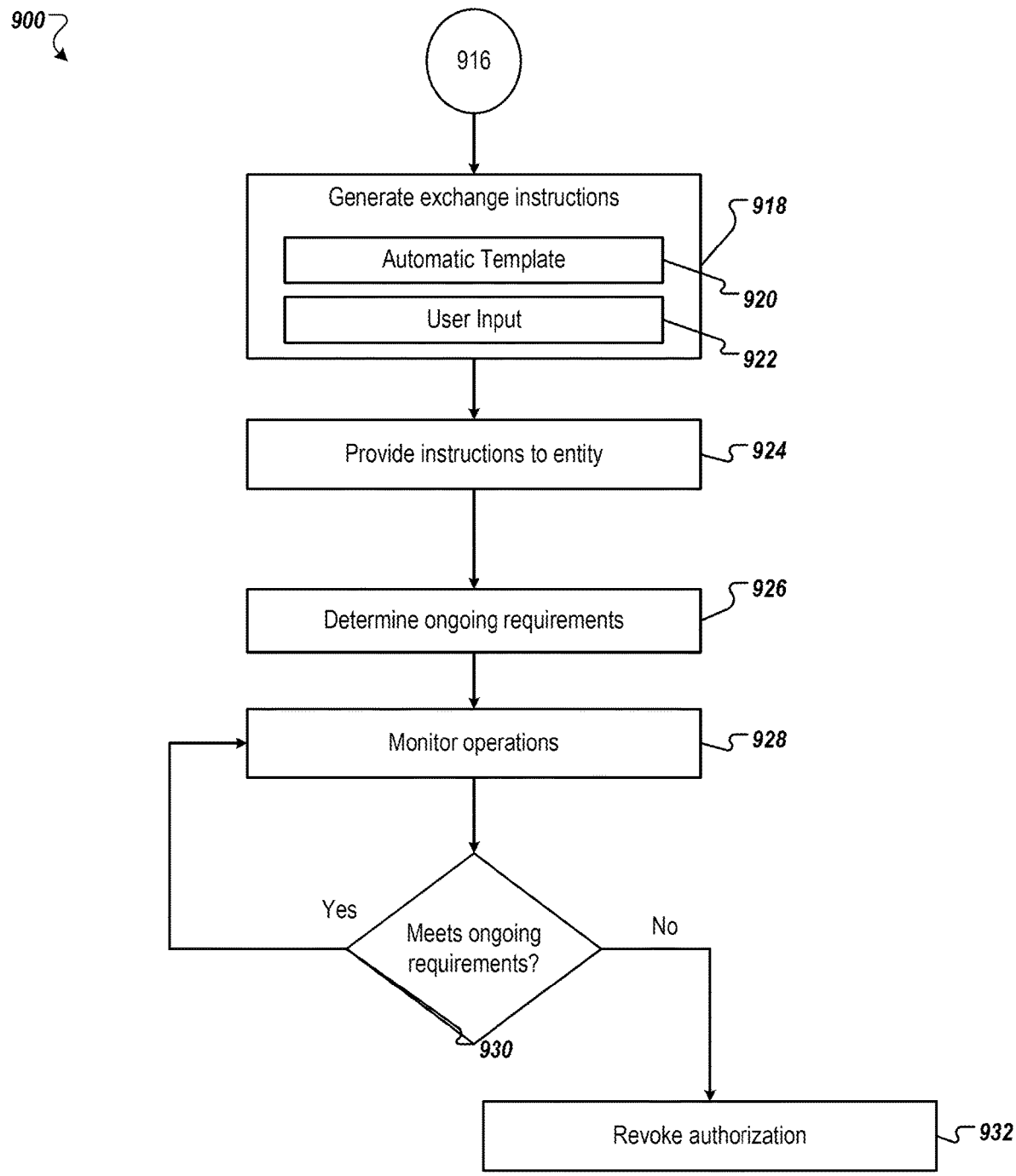

FIGS. 9A-B are a flowchart of a process 900 for generating instances of the cryptocurrency enclave exchange described herein. The process 900 can be used, for example, with the enclave memory 206 and the enclave processors 204, as described with respect to FIGS. 1-6. As such elements of FIGS. 1-6 may be used in the description of the process 900. However, another system or systems can be used to perform the process 900 or another similar process.

Referring to the process 900 in both FIGS. 9A-B, a request to instantiate an exchange is received in 902. For example, a system for generating software instances of cryptocurrency exchanges can include computer-memory storing instructions that, when executed by one or more processors, cause the processors to perform operations comprising receiving, from a client device, a request to instantiate an instance of a cryptocurrency exchange configured to exchange assets between an asset-pair of blockchain-managed cryptocurrencies. The client device can be operated by an entity or user that wishes to run a new exchange, as described herein.

A qualification-list is provided in 904. For example, the computer-memory storing instructions that, when executed by the processors, cause the processors to perform operations further comprising providing, to the client device, a qualification-list that specifies one or more qualifications that must demonstrated in order to be authorized to instantiate the instance of the cryptocurrency exchange. As described in reference to FIG. 8, the qualification-list can require the entity at the client device to provide proof of a bond, crypto asset, identity, and/or regulatory approval. Satisfying requirements of the qualification-list ensure that the entity at the client device is capable of running and operating the new exchange. Moreover, satisfying the requirements ensures that the entity can be trusted, subject to verification as described below, and is not seeking to operate the new exchange to harm other entities, exchanges, or users of the exchanges.

Next, data corresponding to the qualifications is received in 906. For example, the computer-memory storing instructions that, when executed by the processors, cause the processors to perform operations further comprising receiving data corresponding to the qualifications demonstrating that the qualifications have been met. In some examples, the data corresponding to the qualifications can be received from the client device. In other examples, the data corresponding to the qualifications can be accessed on the blockchain. The data can be a signed proof of ownership of a crypto asset. A record of the owned crypto asset and/or bond can also be received by the system described herein. Therefore, at least some of the data corresponding to one of the qualifications can include a cryptographic proof of ownership of a digital asset. In some examples, the digital asset is managed on a blockchain of one of the currencies of the asset-pair.

A bid-price for the exchange instance is determined in 908. For example, the computer-memory storing instructions that, when executed by the processors, cause the processors to perform operations further comprising determining a bid-price for the instance of a cryptocurrency exchange configured to exchange assets between the asset-pair. As described herein (e.g., refer to FIG. 8), the bid-price can be dynamically changed depending on how liquid or illiquid a market is for the asset-pair. The bid-price is determined after receiving data corresponding to the qualifications demonstrating that the qualifications have been met. Determining the bid-price after receiving the data is advantageous to ensure that bad actors are prevented from spamming requests to instantiate exchanges that they do not intend to actually follow through with or run. Receiving data corresponding to the qualifications demonstrates that the entity at the client device took some costly action (e.g., obtaining crypto assets or a bond), is serious about running the new exchange, and is ready to pay whatever bid-price is determined in 908. The bid-price can be based on the asset-pair that the instance of the cryptocurrency exchange is configured to exchange assets between. The bid-price can also be based on other conditions, such as changes in the market of the asset-pairs.

For example, the bid-price can be determined based on determining an instances count in 910. In other words, determining a bid-price for the instance of the cryptocurrency exchange configured to exchange assets between the asset-pair comprises determining a count of the number of existing instance of the cryptocurrency exchange configured to exchange assets between the asset-pair, and determining the bid-price using the count. Where the count is high (e.g., above a predetermined threshold or relative/in comparison to counts associated with other asset-pairs), many entities are interested in instantiating exchanges for the associated asset-pair. As a result, the bid-price for the associated asset-pair can be high. On the other hand, where the count is low (e.g., below a predetermined threshold or relative/in comparison to counts associated with other asset-pairs), fewer entities are interested in instantiating exchanges for the associated pair. As a result, the bid-price for the asset-pair can be low. The lower bid-price can incentivize entities to instantiate exchanges for this particular asset-pair instead of for asset-pairs having higher counts.

Bid-price payment confirmation is received in 912. For example, the computer-memory storing instructions that, when executed by the processors, cause the processors to perform operations further comprising receiving confirmation of payment of the bid-price. The confirmation can be received from the client device. The confirmation can include payment of the bid-price. In other words, the confirmation indicates that the entity has accepted the bid-price and is ready to run the new exchange.

The entity is registered as authorized for the exchange instance in 914. For example, the computer-memory storing instructions that, when executed by the processors, cause the processors to perform operations further comprising registering, based on receiving the confirmation of payment of the bid-price, an entity as authorized to instantiate the instance of a cryptocurrency exchange configured to exchange assets between the asset-pair. Only once the entity at the client device satisfies the qualification requirements and pays the bid-price can the entity be registered. Registration requires authorizing the entity to run and operate the new exchange.

Moreover, a registration record is submitted in 916. For example, the computer-memory storing instructions that, when executed by the processors, cause the processors to perform operations further comprising submitting a record of the registration to a record-keeping blockchain. As described herein (e.g., refer to FIG. 8), an address or authorization record associating the entity with the exchange for the asset-pair can be written into the blockchain registry. This registration record can later be used to verify authorization of the entity and permit the entity to run the exchange, as described herein (e.g., refer to FIGS. 7-11).

Exchange instructions are generated in 918. For example, the computer-memory storing instructions that, when executed by the processors, cause the processors to perform operations further comprising generating, for the entity, exchange-instructions that when executed by one or more computing devices, cause the computing devices to instantiate the instance of a cryptocurrency exchange configured to exchange assets between the asset-pair. The exchange-instructions are software that permits the entity to run the exchange for the asset-pair.

The exchange-instructions can be generated using an automatic template 920. In other words, the exchange-instructions are generated automatically without user input. The exchange-instructions can be generated from a template updated to interact with blockchains of each asset of the asset-pair. As described herein (e.g., refer to FIG. 8), the exchange-instructions template can include plugins for the two assets of the new exchange. Since the assets already exist, the template's plugins can be automatically populated to link to the blockchains of the two assets.

The exchange-instructions can also be generated using user input 922. The input can be provided by the entity that is authorized to run the exchange. User input (e.g., in the form of new software code) can be required in situations where the entity generates its own digital asset that is not known or available on the public blockchain. In some examples, the exchange-instructions can be generated using a combination of the automatic template in 920 and the user input in 922.

The exchange-instructions are provided to the entity in 924. For example, the computer-memory storing instructions that, when executed by the processors, cause the processors to perform operations further comprising providing the exchange-instructions. The entity can receive the exchange-instructions. In some examples, one or more computing devices of the entity can receive the exchange-instructions. Once received, the entity can execute the exchange-instructions, thereby running the exchange for the asset-pair.

Ongoing requirements are determined in 926. For example, the computer-memory storing instructions that, when executed by the processors, cause the processors to perform operations further comprising determining ongoing requirements for the instance of the cryptocurrency exchange configured to exchange assets between the asset-pair. The ongoing requirements can include a rule defining a minimum volume of cryptocurrency transactions per time period. As described throughout (e.g., refer to FIG. 8), the purpose of determining ongoing requirements is to ensure that the entity continues to provide good services on the exchange and is not merely sitting on the network to make for more overhead that disrupts other exchanges, entities, and users.

Thus, operations are monitored in 928. For example, the computer-memory storing instructions that, when executed by the processors, cause the processors to perform operations further comprising monitoring operations of the exchange. The system described herein can review transaction history, records, volume, responsiveness, and/or other ongoing requirements that were determined in 926 for the exchange.

In 930, it is determined whether the ongoing requirements are met. If they are, then the entity can continue running and operating the exchange for the asset-pair. Moreover, the entity can be continuously monitored to determine whether the entity meets the ongoing requirements. Monitoring can be performed periodically and/or at predetermined times. 928-930 is therefore repeated.

Still referring to 930, if the ongoing requirements are not met, then authorization is revoked in 932. For example, the computer-memory storing instructions that, when executed by the processors, cause the processors to perform operations further comprising revoking the authorization responsive to a determination that the exchange has failed to meet the ongoing requirements. As a result, the entity no longer is authorized or able to run and operate the exchange for the asset-pair.

Figure 10:
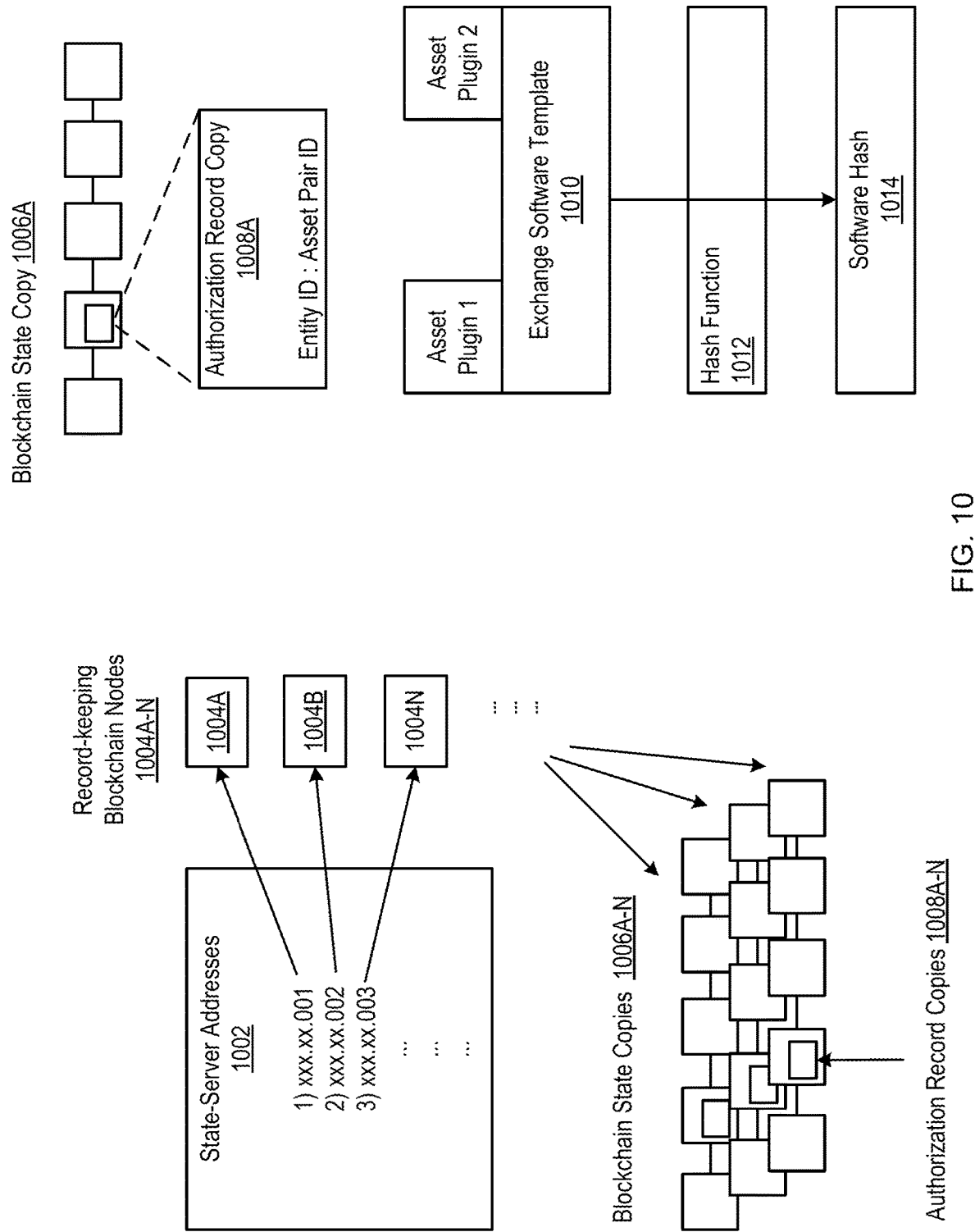
FIG. 10 is a conceptual diagram for operating authorization-limited software in a secure environment.

FIG. 10 is a conceptual diagram for operating authorization-limited software in a secure environment. The software runs inside the secure environment (e.g., enclave) and the secure environment does not have access to the information in the blockchain. Thus, one or more state-server addresses 1002 can be identified by the secure environment. The state-server addresses 1002 can be hard-coded into the authorization-limited software that runs inside the secure environment. Each of the state-servers can be individual, anonymous client blockchain nodes, as previously described. For example, the state-servers can be oracles that report on a state of the blockchain. In other words, the state-servers are each independent of, and geographically separated from, enclave processors and non-enclave processors. In some examples, the state-servers can be blockchain replicators that are configured merely to reach out and grab states of the blockchain. The state-servers can also be core nodes of the record-keeping blockchain. The state-servers can directly read record-keeping blockchain nodes 1004A-N and generate respective blockchain state copies 1006A-N. Therefore, the state-servers are mechanisms/tools that the secure environment can use to access information that is stored on the blockchain.

Each of the blockchain state copies 1006A-N can have authorization record copies 1008A-N. The authorization record copy 1008A, as described throughout this disclosure (e.g., refer to FIG. 8), includes an Entity ID associated with an Asset Pair ID. If the Entity ID is recorded in a predetermined number of the authorization record copies 1008A-N of the blockchain state copies 1006A-N, then the secure environment can determine that the associated entity is authorized to execute instructions for the authorization-limited software within the entity's enclave computing environment.

Once authorization is verified, an exchange software template 1010 can be automatically generated, as described in reference to FIGS. 7-9. The software template 1010 can be fed into a hash function 1012 to generate a software hash 1014 that proves the entity is using the right software and is not tampering, or has not tampered, the software.

Figure 11:
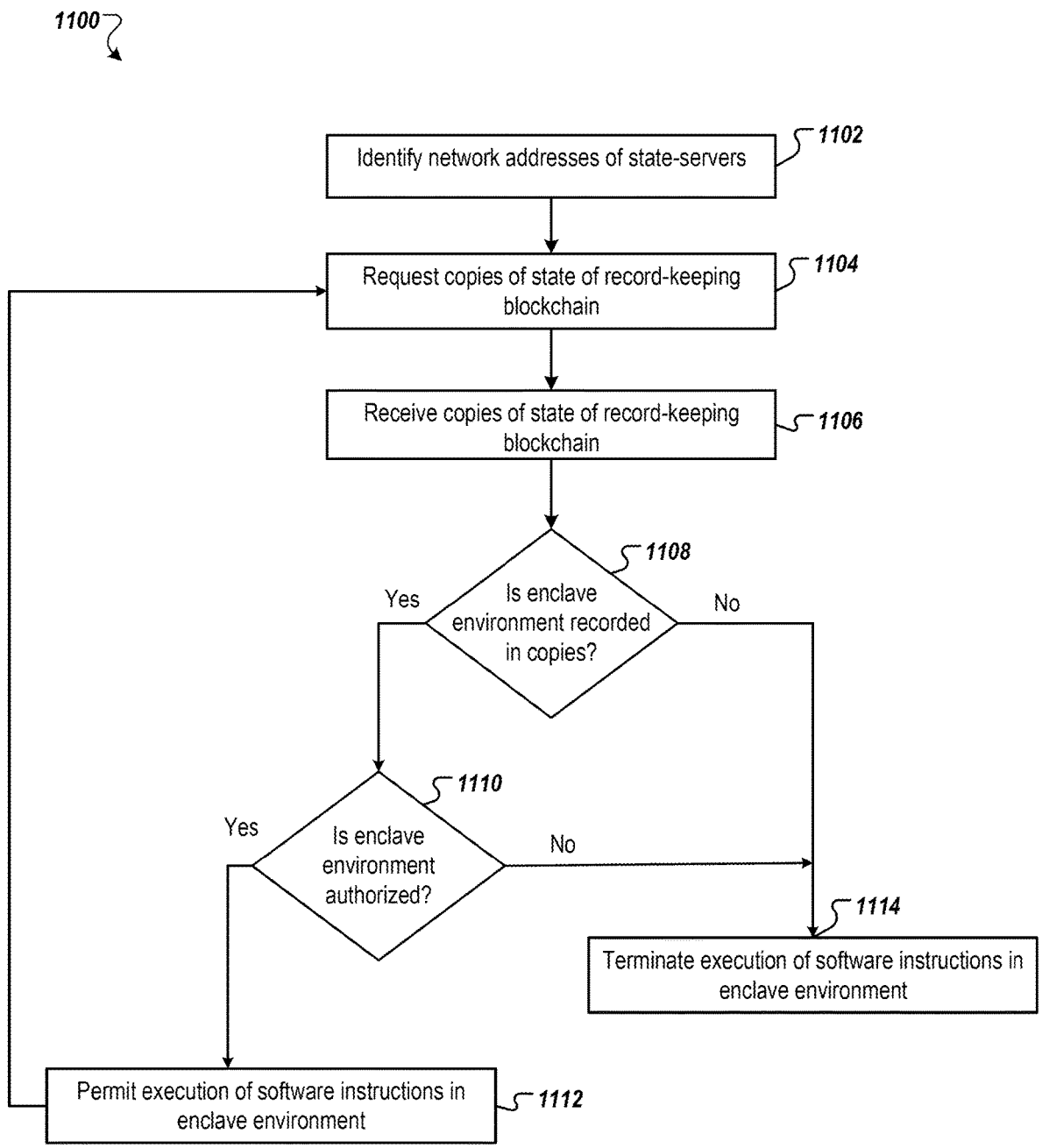
FIG. 11 is a flowchart of a process for operating authorization-limited software in the secure environment Like reference symbols in the various drawings indicate like elements.

FIG. 11 is a flowchart of a process 1100 for operating authorization-limited software in the secure environment. The process 1100 can be used, for example, with the non-enclave memory 214, non-enclave processors 212, enclave memory 206, and the enclave processors 204, as described with respect to FIGS. 1-6. As such, elements of FIGS. 1-6 may be used in the description of the process 1100. However, another system or systems can be used to perform the process 1100 or another similar process.

Referring to the process 1100, network addresses of state-servers are identified in 1102. For example, a system for operating authorization-limited software in a secure environment can include computer-memory storing instructions that, when executed by the enclave-processors, cause the enclave-processors to perform, within an enclave computing environment, operations comprising identifying a network addresses of a plurality of state-servers that are each configured to, upon request, provide a copy of the state of a record-keeping blockchain. As described in reference to FIG. 10, the network addresses can be hardcoded into the software to ensure that the addresses are not rewritten. As a result, data security and integrity are maintained and malicious entities/hackers do not access the enclave environment. Thus, the network addresses are hard-coded in the instructions such that a hash of the instructions is influenced by the network addresses, the hash being publicly available to prove authenticity of the authorization-limited software.

Copies of a state of the record-keeping blockchain are requested in 1104. For example, the computer-memory storing instructions that, when executed by the enclave-processors, cause the enclave-processors to perform, within an enclave computing environment, operations further comprising requesting, from at least some of the state-servers, copies of the state of the record-keeping blockchain.

Copies of the state of the record-keeping blockchain are received in 1106. For example, the computer-memory storing instructions that, when executed by the enclave-processors, cause the enclave-processors to perform, within an enclave computing environment, operations further comprising receiving one or more copies of the state of the record-keeping blockchain. The copies of the state of the record-keeping blockchain are received from the one or more state-servers. Receiving one or more copies of the state of the record-keeping blockchain comprises delaying until a minimum number of the copies of the state of the record-keeping blockchain are received. Therefore, the operations further comprise determining if a minimum number of the copies of the state of the record-keeping blockchain each record the enclave computing environment as authorized to execute the instructions of the authorization-limited software, the minimum number being greater than one. If some predetermined minimum number of all the state-servers respond with copies of the state of the blockchain, then it is indicative that the state returned is in fact reliable and accurate. Waiting to review authorization of the enclave environment until the minimum number of copies of the state of the blockchain are received is beneficial to protect against malicious actors that may be within one or more state-servers or other core nodes of the blockchain In 1108, it is determined whether the enclave environment is recorded in the copies of the state of the record-keeping blockchain. For example, the computer-memory storing instructions that, when executed by the enclave-processors, cause the enclave-processors to perform, within an enclave computing environment, operations further comprising determining if the enclave computing environment is authorized to execute the instructions of the authorization-limited software including determining if the enclave computing environment is recorded, in the state of the record-keeping blockchain, as authorized to execute the instructions of the authorization-limited software. As described in reference to FIGS. 7-10, it can be determined whether the enclave computing environment's identifier (e.g., entity ID, hardware ID) is recorded based on accessing/viewing the authorization record in the copies of the state of the blockchain. Thus, the operations further comprise determining if an identifier of a user associated with the enclave computing environment is recorded, in the state of the record-keeping blockchain, as authorized to execute the instructions of the authorization-limited software.

If the enclave environment is recorded in the copies, then it is determined whether the enclave environment is authorized in 1110. For example, the computer-memory storing instructions that, when executed by the enclave-processors, cause the enclave-processors to perform, within an enclave computing environment, operations further comprising determining if the enclave computing environment is authorized to execute the instructions of the authorization-limited software including determining if the enclave computing environment is recorded, in the state of the record-keeping blockchain, as authorized to execute the instructions of the authorization-limited software. The operations can further comprise determining if none of the copies of the state of the record-keeping blockchain record the enclave computing environment as not unauthorized to execute the instructions of the authorization-limited software. In other words, it is double-checked that there is no record in the copies of the state of the blockchain that the entity or enclave environment is not authorized to run the software.

If the enclave environment is authorized in 1110, then execution of the software instructions in the enclave environment is permitted in 1112. In other examples, the execution of the software instructions merely continues in 1112. The operations further comprise periodically repeating 1104-1112 to determine whether authorization has been revoked from the enclave environment. 1104-1112 can be repeated daily, continuously over time, and/or during another predetermined timeframe.

If the enclave environment is not recorded in the copies of the state of the blockchain in 1108 or the enclave environment is not authorized in 1110, execution of the software instructions in the enclave environment is terminated in 1114. For example, the computer-memory storing instructions that, when executed by the enclave-processors, cause the enclave-processors to perform, within an enclave computing environment, operations further comprising selectively terminating execution of the instructions of the authorization-limited software based on a determination that the enclave computing environment is not authorized to execute the instructions of the authorization-limited software. Therefore, when it is determined that the enclave environment is not authorized to run the exchange and the corresponding software, the software is immediately terminated such that the enclave environment can no longer run the exchange. This can occur in situations in which a malicious actor attempts to take over and harm the enclave environment. By terminating the software execution, the malicious actor can be stopped.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for providing an exchange in a trusted execution environment, the system comprising:
    an exchange program that is configured to provide a digital exchange for digital assets; and
    one or more computer servers, each computer server comprising one or more computer processors and memory, wherein the one or more computer processors and memory provide a secure enclave that is configured to provide i) the trusted execution environment within which execution of the exchange program is secure from observation and manipulation by other operations outside of the secure enclave and ii) a trustless storage system that provides persistent storage of data that is accessible for observation and manipulation by other operations outside the trustless storage system, wherein execution of the exchange program in the secure enclave comprises:
        loading the exchange program into secure memory within the secure enclave;
        performing an attestation operation on the exchange program loaded into the secure memory within the secure enclave, the attestation operation configured to validate the exchange program;
        outputting results of the attestation operation to identify whether the exchange program loaded in the secure enclave is valid; and
        running the exchange program within the secure enclave, comprising:
            in response to receiving a client request, generating a cleartext data object in secure memory of the secure enclave, wherein the cleartext data object includes information that is associated with the client request;
            generating an encrypted data object in the secure memory of the secure enclave by encrypting the cleartext data object, using an encryption key that is maintained in read only memory of the secure enclave, such that the encryption key is secure from observation and manipulation by other operations outside of the secure enclave;
            after generating the encrypted data object, (i) deleting the cleartext data object from the secure memory of the secure enclave, (ii) generating a signature for the encrypted data object using a signature function, and (iii) storing the generated signature in the secure memory of the secure enclave;
            transferring the encrypted data object out of the secure memory of the secure enclave for persistent storage in the trustless storage system of the secure enclave; and
            in response to a request for return of the encrypted data object from to the secure memory of the secure enclave, (i) receiving a candidate encrypted data object from the trustless storage system of the secure enclave, (ii) determining whether the candidate encrypted data object is the encrypted data object that was transferred for persistent storage in the trustless storage system of the secure enclave, by generating a candidate signature for the candidate encrypted data object using the signature function and determining whether the candidate signature matches the previously generated signature for the encrypted data object, and (iii) in response to determining that the candidate encrypted data object is the encrypted data object, decrypting the candidate encrypted data object using the encryption key that is maintained in read only memory of the secure enclave, such that the cleartext of the candidate encrypted data object is accessible to the trusted execution environment, in the secure memory of the secure enclave.

2. The system of claim 1, wherein the execution of the exchange program in the secure enclave further comprises:
    receiving a request from outside the secure enclave to validate the exchange program; and
    wherein the attestation operation and outputting the results of the attestation operation are performed in response to the request to validate the exchange program,
    wherein outputting the results of the attestation operation comprises transmitting the results outside the secure enclave.

3. The system of claim 2, wherein the request is received from a computing device associated with a participant in the digital exchange, and the results of the attestation operation are transmitted to the computing device in response to the request.

4. The system of claim 1, wherein:
    the attestation operation and outputting the results of the attestation operation are performed in response to a request made by any client to perform the attestation operation at any time, and
    the exchange program is run and provides the digital exchange in response to the results of the attestation operation validating the exchange program loaded in the secure enclave.

5. The system of claim 1, wherein providing the digital exchange comprises:

matching, by the exchange program running within the secure enclave, orders for the digital assets; and adding, by the exchange program running within the secure enclave, records for the matched orders to an order book for the digital exchange, wherein the records for the matched orders transfer ownership of the digital assets from one exchange participant to another exchange participant.

6. The system of claim 5, wherein providing the digital exchange further comprises:

validating, by the exchange program running within the secure enclave, the records using validation values.

7. The system of claim 6, wherein:

the validation values comprise entries in a Merkle tree that correspond to the records in the order book, generating the validation values comprises generating the entries in the Merkle tree to reflect the records added to the order book, and validating the records comprises accessing the entries from the Merkle tree corresponding to the records to validate that the records have not been modified outside of the secure enclave.

8. The system of claim 5, wherein the secure memory comprises volatile memory within the secure enclave and the trustless storage system comprises non-volatile memory.

9. The system of claim 5, wherein the matching is performed in the trusted execution environment without having to wait for consensus across multiple different computing nodes.

10. The system of claim 1, wherein the execution of the exchange program in the secure enclave further comprises providing the digital exchange by running the exchange program within the secure enclave, wherein providing the digital exchange comprises:

matching, by the exchange program running within the secure enclave, orders for the digital assets; and adding, by the exchange program running within the secure enclave, records for the matched orders to an order book for the digital exchange, wherein the records for the matched orders transfer ownership of the digital assets from one exchange participant to another exchange participant.

11. The system of claim 10, wherein:

loading the exchange program into secure memory within the secure enclave further comprises loading at least a portion of the order book into the secure memory, the order book and the exchange program are loaded from the trustless storage system, the order book and the exchange program being stored in the trustless storage system with encryption provided by the secure enclave, the secure enclave being configured to automatically decrypt all data loaded into the secure memory and to automatically encrypt all data transferred out of the secure memory for persistent storage, and providing the digital exchange further comprises:

generating, by the exchange program running within the secure enclave, validation values for the records added to the order book, the validation values being used to validate that the records have not been modified outside of the secure enclave, and transmitting, by the exchange program running within the secure enclave, the records and the validation values to the trustless storage system for persistent storage, wherein the secure enclave automatically encrypts the records and the validation values when transmitted out of the secure enclave, and causes the records and the validations values to be stored in the trustless storage system with encryption specific to the secure enclave.

12. The system of claim 11, wherein providing the digital exchange further comprises:

loading, after the transmitting and by the exchange program running within the secure enclave, the records and the validation values from the trustless storage system, wherein the secure enclave automatically decrypts the records and the validation values when loaded from the trustless storage system into the secure memory; and validating, by the exchange program running within the secure enclave, the records using the validation values.

13. The system of claim 12, wherein:

the validation values comprise entries in a Merkle tree that correspond to the records in the order book, generating the validation values comprises generating the entries in the Merkle tree to reflect the records added to the order book, and validating the records comprises accessing the entries from the Merkle tree corresponding to the records to validate that the records have not been modified outside of the secure enclave.

14. The system of claim 11, wherein the secure memory comprises volatile memory within the secure enclave and the trustless storage system comprises non-volatile memory.

15. The system of claim 10, wherein the matching is performed in the trusted execution environment without having to wait for consensus across multiple different computing nodes.

16. The system of claim 10, wherein identifiers for the exchange participants are encrypted when they are outside of the secure enclave to provide confidentiality, and are only accessible in an unencrypted form from the secure memory within the secure enclave.

17. The system of claim 1, wherein the attestation operation comprises:

retrieving a validated hash value for the exchange program that is loaded in the secure enclave with the exchange program, wherein the validated hash value was previously generated from a validated version of the exchange program;

generating a current hash value of the exchange program as loaded into the secure memory; and comparing the validated hash value and the current hash value to determine whether the exchange program loaded into secure memory is valid.

18. The system of claim 17, further comprising:

a client computing device configured to (i) initiate a remote attestation operation by transmitting a request to the one or more computer servers, (ii) retrieve the validated hash value for the exchange program, (iii) receive the current hash value from the one or more computer servers, and (iv) perform the comparing of the validated hash value and the current hash value to remotely validate the exchange program.

19. The system of claim 18, wherein the current hash value is retrieved from a computer system that makes the validated hash value for the exchange program publicly accessible.

20. The system of claim 17, wherein:

the exchange program is loaded from the trustless storage system, the exchange program being stored in the trustless storage system with encryption provided by the secure enclave, the secure enclave being configured to automatically decrypt all data loaded into the secure memory and to automatically encrypt all data transferred out of the secure memory for persistent storage, and the one or more computer servers are configured to generate the current hash of the exchange program as unencrypted within the secure enclave.

21. The system of claim 1, wherein the execution of the exchange program in the secure enclave further comprises providing the digital exchange by running the exchange program within the secure enclave, wherein providing the digital exchange comprises:
receiving, by the exchange program running within the secure enclave, a request to establish a leveraged order on the digital exchange;
allocating, by the exchange program running within the secure enclave, an available proportion of a pool of digital assets traded on the digital exchange for the leveraged order;
establishing, by the exchange program running within the secure enclave, the leveraged order against the proportion of the pool of digital assets; and
adding, by the exchange program running within the secure enclave, a record for the leveraged order to an order book for the digital exchange.

22. The system of claim 21, wherein the record for the leveraged order identifies the leveraged order as a loan of the proportion of the pool of digital assets to a user establishing the leveraged order.

23. The system of claim 22, wherein the pool of digital assets comprise a plurality of digital assets traded on the digital exchange that collective provide a liquidity pool against which leveraged order are established.

24. The system of claim 23, wherein terms of the loan require the proportion of the pool of digital assets to be returned to the liquidity pool and for payment of interest on the proportion of the pool of digital assets in an amount proportional to a duration and size of the loan.

25. The system of claim 24, wherein the exchange program is further configured to automatically liquidate the leveraged order if a value of the digital assets falls below a predefined value that is greater than a value of the loan and accrued interest at a time of liquidation.

26. The system of claim 25, wherein the automatic liquidation and determinations of the values are performed by the exchange program running within the secure enclave.

27. The system of claim 24, wherein the terms of the loan further require that profits and losses for the proportion of the pool of digital assets from the leveraged order be added to and subtracted from, respectively, a balance for the leveraged order.

28. The system of claim 21, wherein:
loading the exchange program the secure enclave further comprises loading at least a portion of the order book into the secure memory,
the order book and the exchange program are loaded from the trustless storage system,
the order book and the exchange program being stored in the trustless storage system with encryption provided by the secure enclave, and
the secure enclave being configured to automatically decrypt all data loaded into the secure memory and to automatically encrypt all data transferred out of the secure memory for persistent storage.

29. The system of claim 1, wherein the generated signature for the encrypted data object and the candidate signature for the candidate encrypted data object are each a root node of a Merkle tree, and wherein the signature function is a Merkle tree generator which is configured to generate a same root node of the Merkle tree when operating on the same input.

* * * * *